US011546858B2

(12) United States Patent
Huang et al.

(10) Patent No.: US 11,546,858 B2
(45) Date of Patent: *Jan. 3, 2023

(54) POWER CONTROL TECHNIQUES FOR UPLINK CONTROL INFORMATION TRANSMISSIONS IN WIRELESS COMMUNICATIONS

(71) Applicant: QUALCOMM Incorporated, San Diego, CA (US)

(72) Inventors: Yi Huang, San Diego, CA (US); Xiao Feng Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,137

(22) Filed: Mar. 21, 2019

(65) Prior Publication Data
US 2019/0297580 A1 Sep. 26, 2019

Related U.S. Application Data

(60) Provisional application No. 62/647,547, filed on Mar. 23, 2018.

(51) Int. Cl.
H04W 52/04 (2009.01)
H04W 72/04 (2009.01)
(Continued)

(52) U.S. Cl.
CPC ............ *H04W 52/04* (2013.01); *H04L 1/18* (2013.01); *H04W 52/325* (2013.01);
(Continued)

(58) Field of Classification Search
CPC . H04W 52/04; H04W 52/325; H04W 52/327; H04W 52/146; H04W 72/0413; H04W 72/14; H04L 1/18
(Continued)

(56) References Cited

U.S. PATENT DOCUMENTS

2006/0133533 A1* 6/2006 Khandekar ........... H04L 1/0009
375/279
2010/0023830 A1* 1/2010 Wengerter ............ H04L 1/0025
714/748
(Continued)

FOREIGN PATENT DOCUMENTS

AU 2017303719 A1 2/2019
CN 106257856 A 12/2016
(Continued)

OTHER PUBLICATIONS

Huawei: "CR to 38.212 Capturing the Jan18 ad-hoc and RAN1 #92 Meeting Agreements", 3GPP Draft; 38212_CR0001_(REL-15)_R1-1803553, 3rd Generation Partnership Project (3GPP), Mobile Competence Centre ; 650, Route Des Lucioles ; F-06921 Sophia-Antipolis Cedex ; France, vol. RAN WG1, No. Athens; Feb. 26, 2018-Mar. 1, 2018, Mar. 15, 2018 (Mar. 15, 2018), XP051509056, 92 Pages, Retrieved from the Internet: URL:http://www.3gpp.org/ftp/tsg%5Fran/TSG%5FRAN/TSGR%5F79/Docs/RP%2D180200%2Ezip [retrieved on Mar. 15, 2018], section 6.3.2.
(Continued)

Primary Examiner — Chi Tang P Cheng
(74) Attorney, Agent, or Firm — Holland & Hart LLP/Qualcomm Incorporated

(57) ABSTRACT

Methods, systems, and devices for wireless communications are described that provide for a transmission of uplink control information (UCI) from a user equipment (UE) to a base station using uplink shared channel resources in the absence of other uplink shared channel data. Based in the UCI and uplink control parameters, the UE may determine an uplink power for transmission of the UCI based at least in part on a spectrum efficiency or a number of bits per resource element (BPRE) for the UCI.

30 Claims, 16 Drawing Sheets

(51) Int. Cl.
*H04L 1/18* (2006.01)
*H04W 72/14* (2009.01)
*H04W 52/32* (2009.01)
*H04W 52/14* (2009.01)

(52) U.S. Cl.
CPC ..... *H04W 52/327* (2013.01); *H04W 72/0413* (2013.01); *H04W 72/14* (2013.01); *H04W 52/146* (2013.01)

(58) Field of Classification Search
USPC .......................................................... 370/311
See application file for complete search history.

(56) References Cited

U.S. PATENT DOCUMENTS

| | | | | |
|---|---|---|---|---|
| 2010/0195624 | A1* | 8/2010 | Zhang | H04B 7/0413 370/335 |
| 2011/0159914 | A1* | 6/2011 | Chen | H04W 52/367 455/522 |
| 2018/0026769 | A1* | 1/2018 | Lee | H04L 5/00 370/329 |
| 2020/0068496 | A1 | 2/2020 | Yang et al. | |
| 2020/0221494 | A1* | 7/2020 | Nakamura | H04W 74/006 |
| 2020/0252178 | A1* | 8/2020 | Marinier | H04W 72/042 |

FOREIGN PATENT DOCUMENTS

| | | | |
|---|---|---|---|
| EP | 3120485 | A1 | 1/2017 |
| WO | WO-2018021404 | A1 | 2/2018 |

OTHER PUBLICATIONS

International Search Report and Written Opinion—PCT/US2019/023722—ISA/EPO—dated May 28, 2019.
Nokia: "CR to 38.214 Capturing the Jan18 ad-hoc and RAN1 #92 Meeting Agreements", 3GPP Draft; 38214_CR0001_(REL-15)_R1-1803555, 3rd Generation Partnership Project (3GPP), Mobile Competence Centre; 650, Route Des Lucioles ; F-06921 Sophia-Antipolis Cedex ; France, vol. RAN WG1 , No. Athens; Feb. 26, 2018-Mar. 1, 2018, Mar. 15, 2018 (Mar. 15, 2018), XP051509058, 79 Pages, Retrieved from the Internet: URL:http://www.3gpp.org/ftp/tsg%5Fran/TSG%5FRAN/TSGR%5F79/Docs/RP%2D180200%2Ezip [retrieved on Mar. 15, 2018], sections 6.1.2.1, 6.1.4.
Samsung: "Corrections on PUSCH Power Control", 3GPP Draft; R1-1800467 Corrections On PUSCH Power Control—Samsung, 3rd Generation Partnership Project (3GPP), Mobile Competence Centre; 650, Route Des Lucioles; F-06921 Sophia-Antipolis Cedex; Fran, vol. RAN WG1, No. Vancouver, Canada; Jan. 22, 2018-Jan. 26, 2018, Jan. 13, 2018 (2Jan. 13, 2018), XP051384885, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], section 2, p. 2.
Samsung: "CR to 38.213 Capturing the NR ad-hoc 1801 and RAN1 #92 Meeting Agreements", 3GPP Draft; 38213_CR0001_(REL-15)_R1-1803554, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 26, 2018-Mar. 1, 2018, Mar. 15, 2018 (Mar. 15, 2018), XP051509057, 81 Pages, Retrieved from the Internet: URL:http://www.3gpp.org/ftp/tsg%5Fran/TSG%5FRAN/TSGR%5F79/Docs/RP%2D180200%2Ezip [retrieved on Mar. 15, 2018], section 7 .1.1.
Taiwan Search Report—TW108110039—TIPO—dated Mar. 29, 2022.

* cited by examiner

| MCS Index $I_{MCS}$ | Modulation Order $Q_m$ | Target code Rate x 1024 $R$ | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

POWER CONTROL TECHNIQUES FOR UPLINK CONTROL INFORMATION TRANSMISSIONS IN WIRELESS COMMUNICATIONS

CROSS REFERENCES

The present application for patent claims the benefit of U.S. Provisional Patent Application No. 62/647,547 by HUANG, et al., entitled "POWER CONTROL TECHNIQUES FOR UPLINK CONTROL INFORMATION TRANSMISSIONS IN WIRELESS COMMUNICATIONS," filed Mar. 23, 2018, assigned to the assignee hereof, and expressly incorporated herein by reference in its entirety.

BACKGROUND

The following relates generally to wireless communication and to power control techniques for uplink control information transmissions in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses for uplink power control for uplink control information (UCI) transmitted using shared channel resources. Generally, the described techniques provide for a transmission of UCI from a user equipment (UE) using physical uplink shared channel (PUSCH) resources to inform a serving base station about conditions of a wireless channel and other control information for managing communication over the wireless channel. In some cases, a UE may determine that UCI is to be transmitted using PUSCH resources without other PUSCH data (e.g., UCI is transmitted without accompanying uplink shared channel (UL-SCH) data) based on receiving a certain combination of uplink control parameters in an uplink grant, and may identify UCI to be transmitted in the uplink transmission. Based in the UCI and uplink control parameters, the UE may determine an uplink power for transmission of the UCI based at least in part on a spectrum efficiency or a number of bits per resource element (BPRE) for the UCI.

In some cases, a UE may receive an uplink resource allocation for an uplink transmission of UCI using PUSCH resources, which may indicate one or more of a modulation order, a code rate, or a number of resource blocks (RBs) for the uplink transmission. In some cases, the UE may calculate the BPRE as a multiple of the code rate, where the multiple is a function of the signaled modulation order. In some cases, the UE may identify the BPRE based on a mapping (e.g., provided in a look-up table) between the BPRE and a modulation and coding scheme (MCS) field or index signaled with the uplink resource allocation. In further cases, the UE may calculate a transport block size (TBS) for the UCI based at least in part on the code rate, the modulation order, and the number of RBs allocated for the transmission of the UCI, and may determine the BPRE based on a ratio between the calculated TBS and a number of resource elements to be used for the transmission of the UCI. The UE may use the BPRE according to a predetermined power control function to determine the uplink transmit power.

A method of wireless communication is described. The method may include receiving, by a UE, a grant indicating allocated uplink resources of an UL-SCH for an uplink transmission, the allocated uplink resources including resources allocated for transmission of UCI and lacking resources allocated for transmission of other UL-SCH information, identifying, based at least in part on one or more of a modulation order or code rate for the UCI indicated in the grant, a number of BPRE for the UCI, and determining, based at least in part on the BPRE, an uplink power for transmission of the UCI.

An apparatus for wireless communication is described. The apparatus may include means for receiving, by a UE, a grant indicating allocated uplink resources of an UL-SCH for an uplink transmission, the allocated uplink resources including resources allocated for transmission of UCI and lacking resources allocated for transmission of other UL-SCH information, means for identifying, based at least in part on one or more of a modulation order or code rate for the UCI indicated in the grant, a number of BPRE for the UCI, and means for determining, based at least in part on the BPRE, an uplink power for transmission of the UCI.

Another apparatus for wireless communication is described. The apparatus may include a processor, memory coupled to the processor, and instructions stored in the memory. The instructions may be operable to cause the processor to receive, by a UE, a grant indicating allocated uplink resources of an UL-SCH for an uplink transmission, the allocated uplink resources including resources allocated for transmission of UCI and lacking resources allocated for transmission of other UL-SCH information, identify, based at least in part on one or more of a modulation order or code rate for the UCI indicated in the grant, a number of BPRE for the UCI, and determine, based at least in part on the BPRE, an uplink power for transmission of the UCI.

A non-transitory computer-readable medium for wireless communication is described. The non-transitory computer-readable medium may include instructions operable to cause a processor to receive, by a UE, a grant indicating allocated uplink resources of an UL-SCH for an uplink transmission, the allocated uplink resources including resources allocated for transmission of UCI and lacking resources allocated for transmission of other UL-SCH information, identify, based at least in part on one or more of a modulation order or code rate for the UCI indicated in the grant, a number of BPRE for the UCI, and determine, based at least in part on the BPRE, an uplink power for transmission of the UCI.

Some examples of the method, apparatus, and non-transitory computer-readable medium described above may further include processes, features, means, or instructions for determining the BPRE based at least in part on a product of the code rate and the modulation order indicated in the grant. Some examples of the method, apparatus, and non-transitory computer-readable medium described above may further include processes, features, means, or instructions for determining the BPRE as multiple of the code rate, wherein the multiple may be a function of the modulation order indicated in the grant.

Some examples of the method, apparatus, and non-transitory computer-readable medium described above may further include processes, features, means, or instructions for identifying the BPRE based at least in part on a mapping between an MCS indicated in the grant and a spectral efficiency. In some examples of the method, apparatus, and non-transitory computer-readable medium described above, the MCS may be indicated as an MCS index value in the grant, and wherein the spectral efficiency may be mapped to the MCS index value. In some examples of the method, apparatus, and non-transitory computer-readable medium described above, the mapping may be provided in a preconfigured look-up table.

Some examples of the method, apparatus, and non-transitory computer-readable medium described above may further include processes, features, means, or instructions for calculating a TBS for the transmission of the UCI based at least in part on the code rate, the modulation order, and a number of RBs allocated for the transmission of the UCI. Some examples of the method, apparatus, and non-transitory computer-readable medium described above may further include processes, features, means, or instructions for determining the BPRE based on a ratio between the calculated TBS and a number of resource elements to be used for the transmission of the UCI.

In some examples of the method, apparatus, and non-transitory computer-readable medium described above, the BPRE may be determined by dividing the TBS by the number of resource elements. In some examples of the method, apparatus, and non-transitory computer-readable medium described above, the number of resource elements may be determined based at least in part on the number of RBs indicated in the grant and a number of symbols in transmission period for the transmission of the UCI. In some examples of the method, apparatus, and non-transitory computer-readable medium described above, the TBS may be determined according to a preconfigured TBS calculation procedure for UL-SCH transmission having resources allocated for transmission of other UL-SCH information.

Some examples of the method, apparatus, and non-transitory computer-readable medium described above may further include processes, features, means, or instructions for identifying a number of RBs for transmission of the UCI indicated in the grant. Some examples of the method, apparatus, and non-transitory computer-readable medium described above may further include processes, features, means, or instructions for determining the BPRE further based at least in part on the number of RBs, the code rate, and the modulation order.

Some examples of the method, apparatus, and non-transitory computer-readable medium described above may further include processes, features, means, or instructions for transmitting the UCI using the determined uplink power. In some examples of the method, apparatus, and non-transitory computer-readable medium described above, the UCI includes one or more of acknowledgment/negative-acknowledgment (ACK/NACK) feedback information, or one or more channel state information (CSI) parts.

BRIEF DESCRIPTION OF THE DRAWINGS

FIG. 4 illustrates an example of a look-up table that supports power control techniques for uplink control information transmissions in wireless communications in accordance with aspects of the present disclosure.

DETAILED DESCRIPTION

Figure 1:
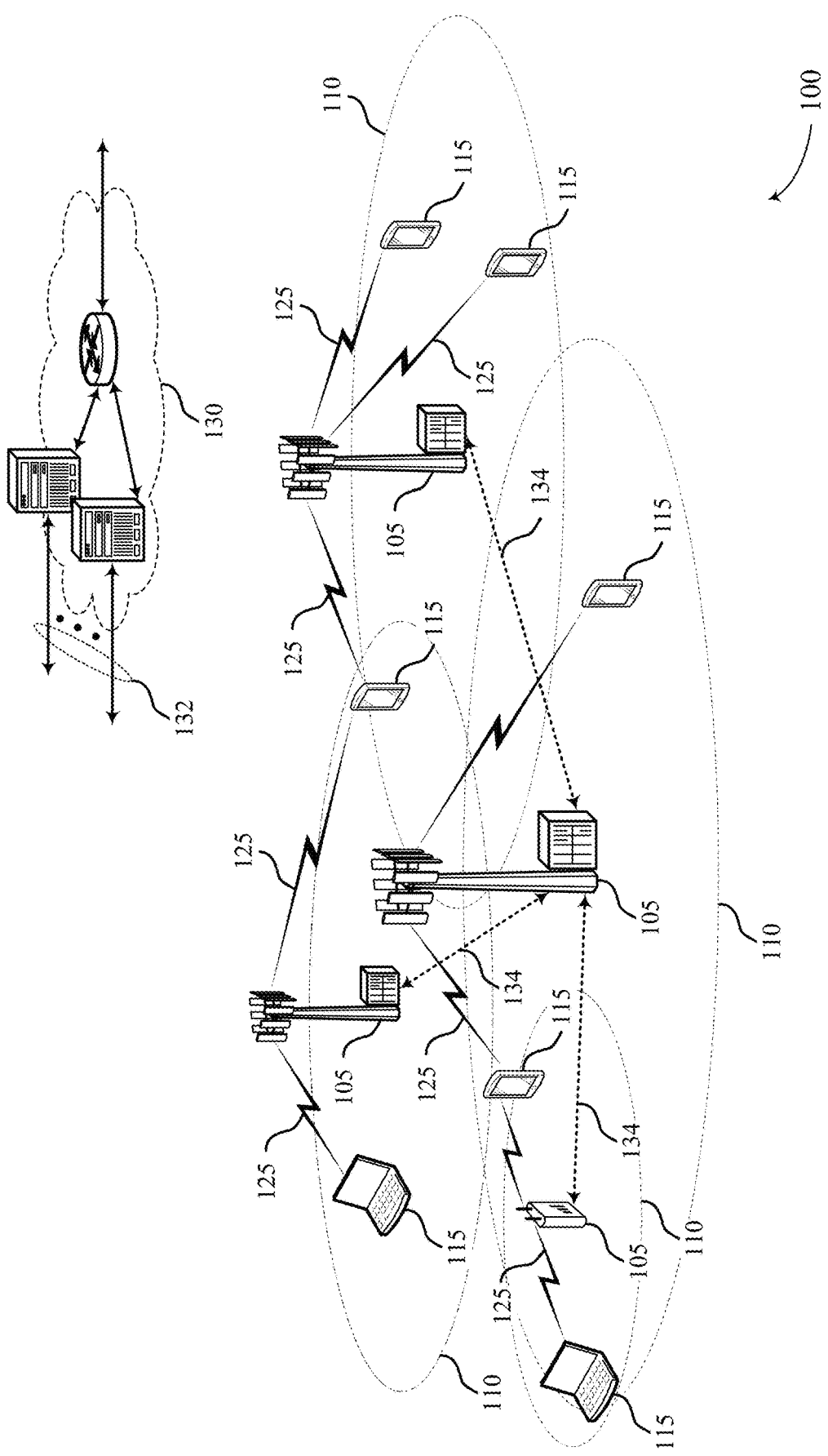
FIG. 1 illustrates an example of a system for wireless communication that supports power control techniques for uplink control information transmissions in wireless communications in accordance with aspects of the present disclosure.

The described techniques relate to improved methods, systems, devices, or apparatuses that provide uplink power control for transmission of uplink control information (UCI) from a user equipment (UE) using physical uplink shared channel (PUSCH) resources. In some examples, the techniques may be used for transmitting UCI on a PUSCH transmission that does not include uplink shared channel (UL-SCH) data. Such UCI may, for example, inform a serving base station about conditions of a wireless channel and other control information for managing communication over the wireless channel. In some cases, a UE may determine that UCI is to be transmitted using PUSCH resources without other PUSCH data (e.g., UCI is transmitted without accompanying UL-SCH data) based on receiving a certain combination of uplink control parameters in an uplink grant, and may identify UCI to be transmitted in the uplink transmission. Based on the UCI and uplink control parameters, the UE may determine an uplink power for transmission of the UCI based at least in part on a spectrum efficiency or a number of bits per resource element (BPRE) for the UCI.

UCI may include different types of information, such as hybrid automatic repeat request (HARD) acknowledgment (HARQ-ACK) data, channel state information (CSI), one or more reference signals, or any combinations thereof. In some cases, a UE may transmit UCI within a transmission sent within a control channel (e.g., a physical uplink control channel (PUCCH)). In some cases, however, the UE may transmit UCI in a shared data channel (e.g., PUSCH), which may be referred to herein as piggybacking. In such cases, a base station may send a grant allocating resources of a PUSCH to the UE for sending UCI piggybacked on a PUSCH transmission.

In accordance with techniques provided herein, various transmission parameters for UCI transmissions using shared channel resources may be derived at a UE based on values contained in an uplink grant. In some cases, a UE may derive an uplink transmission power for the UCI transmission based on a spectrum efficiency, or BPRE, of the transmission. BPRE and spectrum efficiency may be used interchangeably in the present disclosure, as both relate to an amount of information relayed via particular wireless resources allocated to a UE for the uplink UCI transmission. In some cases, the UE may identify a code rate and a modulation order for the UCI transmission. The code rate may be identified based at least in part on a payload size of the UCI and a number of resources elements (REs) allocated to the UE for the uplink transmission, and the modulation order may be signaled in downlink control information (DCI) that includes the uplink grant.

The UE may determine the BPRE, in some cases, as a multiple of the code rate, where the multiple is a function of the modulation order. In some cases, the UE may identify the BPRE based on a mapping (e.g., provided in a look-up table) between the BPRE and a modulation and coding scheme (MCS) field or index signaled with the uplink resource allocation. In further cases, the UE may calculate a TBS for the UCI based at least in part on the code rate, the modulation order, and the number of resource blocks (RBs) allocated for the transmission of the UCI, and may determine the BPRE based on a ratio between the calculated TBS and a number of resource elements to be used for the transmission of the UCI. The UE may use the BPRE according to a predetermined power control function to determine the uplink transmit power. The UE may generate and transmit the UCI via the allocated uplink resources using the determined uplink transmit power. Such techniques may provide uplink transmission power that is based on the amount of data to be transmitted using the allocated uplink resources, which may enhance the likelihood of successful reception of the UCI at the base station.

Aspects of the disclosure are initially described in the context of a wireless communications system. Aspects of the disclosure are further illustrated by and described with reference to apparatus diagrams, system diagrams, and flowcharts that relate to power control techniques for UCI transmissions in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, wireless communications system 100 may support uplink UCI transmissions by UEs using PUSCH resources without UL-SCH transmissions. In such cases, the UEs 115 may determine an uplink transmission power based on a spectrum efficiency of the UCI transmission.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a UE 115 may receive and process downlink signaling from a serving base station 105 (e.g., DCI indication, RRC signaling) that indicates one or more parameters and includes a grant of resources within the UL-SCH for an uplink transmission. The grant may indicate a set of resource elements in one or more RBs within the UL-SCH are allocated to the UE 115 for an uplink transmission. The UE 115 may then determine, based on the grant, whether the uplink transmission is for UCI or uplink data, and in cases where the uplink transmission is for UCI only, without UL-SCH data, a transmission power for the uplink transmission. The transmission power may be determined based on a spectrum efficiency or BPRE associated with the UCI transmission.

Particular implementations of the subject matter described in this disclosure can be implemented to realize one or more of the following potential advantages. In some implementations, the described techniques can be used as a method for wireless communication to receive, by a UE, a grant indicating allocated uplink resources of an UL-SCH for an uplink transmission, the allocated uplink resources including resources allocated for transmission of UCI and lacking resources allocated for transmission of other UL-SCH information, identify, based at least in part on one or more of a modulation order or code rate for the UCI indicated in the grant, a number of BPRE for the UCI, and determine, based at least in part on the BPRE, an uplink power for transmission of the UCI. One example of an advantage of this method may include a higher likelihood of successful reception of UCI at the base station, for example by the provision of an uplink transmission power based on the amount of data to be transmitted using the allocated uplink resources.

One example of an advantage of determining the BPRE for the UCI based at least in part on a product of the code rate and the modulation order indicated in the grant is the efficient determination of the BPRE for the UCI based on the amount of data to be transmitted using the allocated uplink resources, which helps to provide a higher likelihood of successful reception at the base station.

One example of an advantage of determining the BPRE as multiple of the code rate, where the multiple is a function of the modulation order indicated in the grant is the efficient determination of the BPRE for the UCI based on the amount of data to be transmitted using the allocated uplink resources, which helps to provide a higher likelihood of successful reception at the base station.

One example of an advantage of identifying the BPRE based on a mapping between an MCS indicated in the grant and a spectral efficiency is that the BPRE for the UCI may be efficiently determined based on the amount of data to be transmitted using the allocated uplink resources, which helps to provide a higher likelihood of successful reception at the base station. In some examples the MCS is indicated as an MCS index value in the grant, where the spectral efficiency is mapped to the MCS index value, providing an efficient and compact mechanism for the UE to determine the MCS. In some examples, the mapping is provided in a preconfigured look-up table, further reducing the complexity for the UE to determine the MCS.

Figure 2:
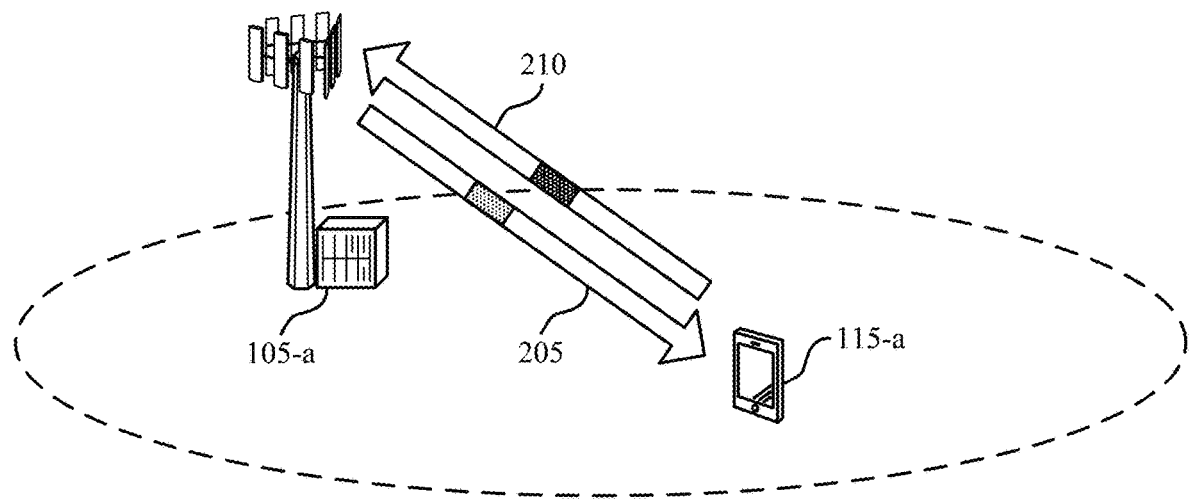
FIG. 2 illustrates an example of a portion of a wireless communication system wireless communication system that supports power control techniques for uplink control information transmissions in wireless communications in accordance with aspects of the present disclosure.

FIG. 2 illustrates an example of a wireless communication system 200 that supports power control techniques for uplink control information transmissions in wireless communications in accordance with various aspects of the present disclosure. In some examples, wireless communication system 200 may implement aspects of wireless communication system 100. For example, wireless communication system 200 includes UE 115-a and base station 105-a, which may be examples of the corresponding devices described with reference to FIG. 1. Wireless communication system 200 may support piggybacking CSI on a PUSCH transmission that might not include UL-SCH data.

UE 115-a may be synchronized with and camped on base station 105-a. In an example, UE 115-a may initiate establishment of an RRC connection with base station 105-a and may be configured to receive downlink transmissions 205 and transmit uplink transmissions 210 over licensed and/or unlicensed (shared) radio frequency spectrum band resources. Additional bearer contexts may be allocated to UE 115-a as part of PDN connectivity, to establish end-to-end connectivity between UE 115-a and a P-GW of a service network.

UE 115-a may receive downlink transmissions 205 from the base station 105-a, including DCI 215 that may contain an uplink grant providing a resource allocation for one or more uplink transmissions 210. The grant may indicate time and frequency resources allocated for an uplink transmission that may span a set of OFDM symbols and a bandwidth that spans a set of subcarriers. In an example, the grant may identify a set of one or more RBs for an uplink transmission, and each of the RBs may include a set of resource elements. Each resource element may correspond to a single subcarrier (e.g., a tone) and a single OFDM symbol. In some cases, UE 115-a may process the grant to determine that none of the resource elements for the PUSCH transmission are allocated for transporting UL-SCH data, and that the PUSCH transmission is to include only UCI 220.

In some cases, the UCI 220 may have a number of different types of information. In an example, the UE 115-a may transmit UCI 220 that may include HARQ-ACK feedback, a single CSI part, multiple CSI parts, or any combination thereof, in one or more uplink transmissions 210. For example, CSI in NR systems may have two different parts, which are CSI part 1 and CSI part 2. When sending CSI, the UE may, in some examples, always send CSI part 1 and may optionally send CSI part 2 or portions of CSI part 2. In some cases, the UCI 220 may also include a phase tracking reference signal (PTRS) that may be used in beamforming feedback.

In some cases, an uplink transmit power for the UCI 220 transmission may be determined based at least in part on a spectrum efficiency, or BPRE, for the UCI 220. In some cases, uplink power control for PUSCH transmissions that include UL-SCH data may be determined based on an established power control procedure (e.g., as defined in 3GPP technical specification 38.213) in which the UE 115-*a* may determine the PUSCH transmission power $P_{PUSCH}$ in a PUSCH transmission period. For example, PUSCH transmission power may be set according to a power control function based on equations of 3GPP TS 38.213:

$$P_{PUSCH,b,f,c}(i, j, q_d, l) = \min\begin{Bmatrix} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{Bmatrix} [dBm],$$

where
- $P_{CMAX,f,c}(i)$ is a configured UE transmit power for carrier f of serving cell c in PUSCH transmission period i.
- $P_{O\_PUSCH,b,f,c}(j)$ is a parameter composed of the sum of configured nominal transmit power components.
- $\alpha_{b,f,c}(j)$ is a parameter, when j=0, $\alpha_{b,f,c}(0)$=1; and when j=1, $\alpha_{b,f,c}(1)$ is provided by a higher layer parameter
- $M_{RB,b,f,c}^{PUSCH}(i)$ is the bandwidth of the PUSCH resource assignment expressed in number of RBs for PUSCH transmission period i on UL BWP b of carrier f of serving cell c and µ is a configured value.
- $PL_{b,f,c}(q_d)$ is a downlink path-loss estimate in dB calculated by the UE.
- $\Delta_{TF,b,f,c}(i)$=is a power adjustment.
- $f_{b,f,c}(i,l)$ is the PUSCH power control adjustment state for UL BWP b of carrier f of serving cell c and PUSCH transmission period i.

In this example, one term of the power control function is $\Delta_{TF,b,f,c}(i)$, which may be determined according to the equation:

$$\Delta_{TF,b,f,c}(i) = 10\log_{10}((2^{K_S \cdot BPRE} - 1) \cdot \beta_{offset}^{PUSCH}).$$

The parameter $K_S$ may be provided by a higher layer parameter (e.g., deltaMCS-Enabled in 3GPP TS 38.213) provided for each UL BWP b of each carrier f and serving cell c. BPRE and $\beta_{offset}^{PUSCH}$ for each UL BWP b of each carrier f and each serving cell c, are computed as below:

$$BPRE = \sum_{r=0}^{C-1} K_r / N_{RE}$$

for PUSCH with UL-SCH data, in which:
C is the number of code blocks, $K_r$ is the size for code block r, and $N_{RE}$ is the number of resource elements determined as $N_{RE} = M_{RB,b,f,c}^{PUSCH}(i) \cdot N_{symb,b,f,c}^{PUSCH}(i)$ excluding REs used for DM-RS transmission, where $N_{symb,b,f,c}^{PUSCH}(i)$ is the number of symbols for PUSCH transmission period i on UL BWP b of carrier f of serving cell c, $M_{RB,b,f,c}^{PUSCH}(i)$ is the bandwidth of the PUSCH resource assignment expressed in number of RBs for PUSCH transmission period i on UL BWP b of carrier f of serving cell c, and where C, and $K_r$ may be determined from the DCI, an RRC configuration, or combinations thereof. Further, $\beta_{offset}^{PUSCH}=1$ when the PUSCH includes UL-SCH data.

In some cases, where the PUSCH does not include UL-SCH data, the BPRE and $\beta_{offset}^{PUSCH}$ may be set differently, such as based on CSI part 1 bits including CRC bits, but not based on HARQ bits or CSI part 2 bits. In such cases, the corresponding BPRE determination may result in an uplink transmit power that does not account for the payload size of HARQ bits and CSI part 2 bits, and thus may be set relatively low for the amount of data to be transmitted. Such transmit power may result in a lower likelihood of successful reception of the UCI 220 at the base station 105-*a*.

According to aspects of the present disclosure, the UE may calculate the BPRE, and thus the corresponding term $\Delta_{TF,b,f,c}(i)$, based on the UCI 220 including CSI part 1 information, as well as CSI part 2 information and HARQ information if one or both are to be transmitted in the UCI 220. Thus, the uplink transmit power in such cases is determined based on a total amount of the UCI 220 data, rather than a portion thereof, which may provide a transmit power that results in a higher likelihood of successful reception at the base station 105-*a*. In some case, the DCI 215 may include an uplink resource allocation that indicates may one or more of a modulation order, a code rate, or a number of RBs for the uplink transmission. In some cases, and resource determination may be determined in a similar manner as for UCI multiplexing on PUSCH with UL-SCH. In some cases, the UE 115-*a* may set the BPRE as a multiple of the code rate, where the multiple is a function of the signaled modulation order. In some cases, the UE 115-*a* may identify the BPRE based on a mapping (e.g., provided in a look-up table) between the BPRE and an MCS field or index signaled with the uplink resource allocation. In further cases, the UE 115-*a* may calculate a TBS for the UCI based at least in part on the code rate, the modulation order, and the number of RBs allocated for the transmission of the UCI, and may determine the BPRE based on a ratio between the calculated TBS and a number of resource elements to be used for the transmission of the UCI. The UE may use the determined BPRE to determine $\Delta_{TF,b,f,c}(i)$, and then determine the uplink transmit power according to the above-described power control functions. In some cases, as indicated, the UCI 220 may include a number of different types of information, such as described in the example of FIG. 3, that may be used for power determination.

Figure 3:
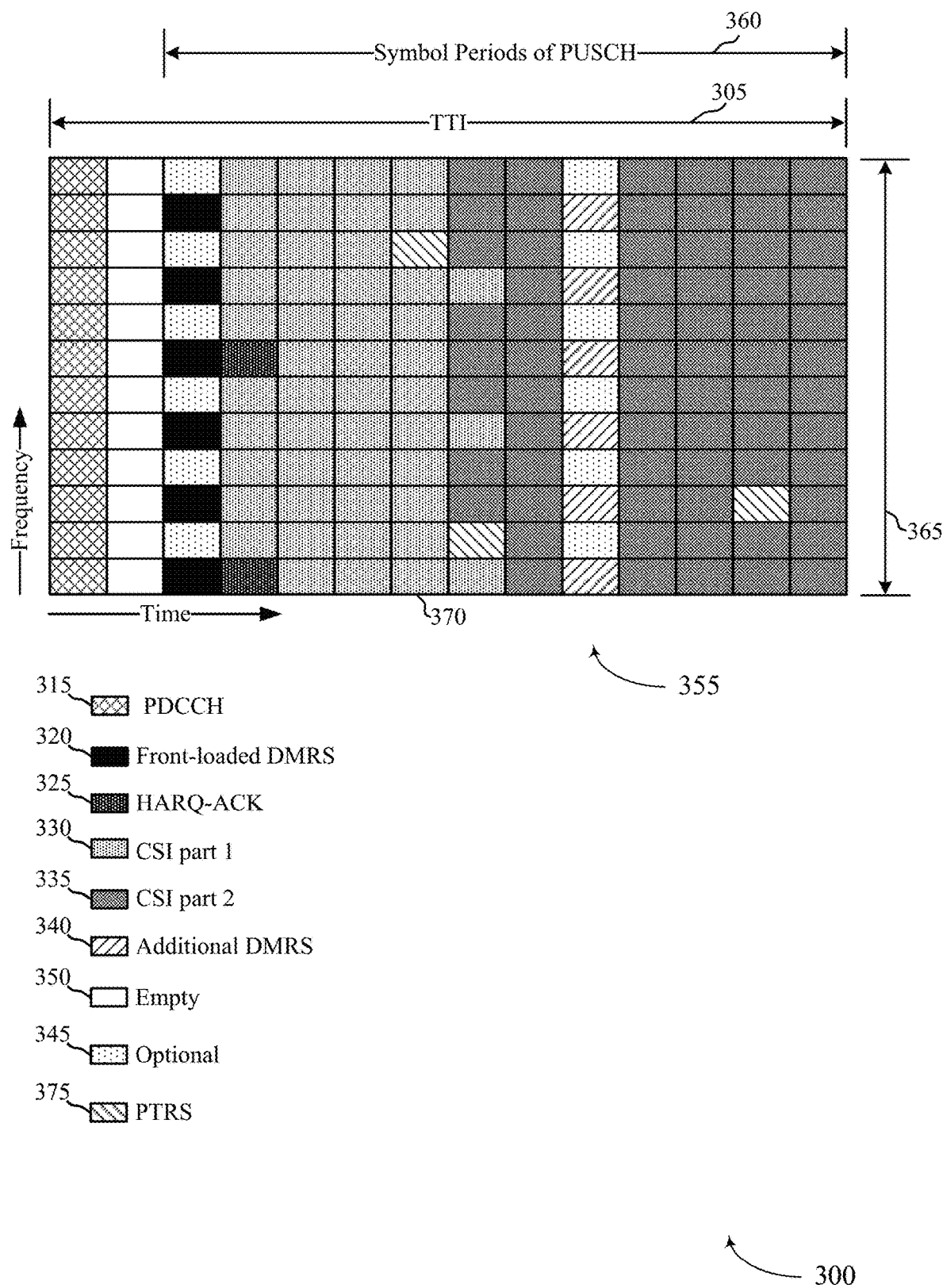
FIG. 3 illustrates an example of a time and frequency resources for uplink control information transmitted using shared channel resources that supports power control techniques for uplink control information transmissions in wireless communications in accordance with aspects of the present disclosure.

FIG. 3 illustrates an example of a time and frequency resources for uplink control information transmitted using shared channel resources 300 that supports power control techniques for UCI transmissions in wireless communications in accordance with various aspects of the present disclosure. In some examples, time and frequency resources for UCI transmitted using shared channel resources 300 may implement aspects of wireless communication system 100 or 200.

In this example, depicted is a transmission time interval (TTI) 305 that includes a PUSCH 355 having a set of resource elements 370 allocated to a UE for an uplink transmission. TTI 305 may correspond to a set of OFDM symbols and a set subcarriers that are a set of time and frequency resources that the base station may allocate to UE for an uplink transmission. Frequency is shown from top to bottom, and time is shown from left to right. The bandwidth of TTI 305 may represent a portion of a system bandwidth that the base station may allocate to one or more UEs. TTI 305 may repeat in time and the base station may allocate each TTI 305 to the same UE or to different UEs. In some cases, the time and frequency resources of TTI 305 may correspond to an RB that includes 12 subcarriers and 14 symbol periods. The time and frequency resources of TTI 305 may include other numbers of subcarriers and/or symbol periods in other cases.

A first symbol period of TTI 305 (e.g., leftmost column) may be a physical downlink control channel (PDCCH) 315 and a second symbol period may be a guard period 350. The PDCCH 315 may include downlink signaling, such as DCI, that transports a grant allocating resources of the PUSCH 355 of the TTI 305 to the UE. The downlink signaling may further include one or more parameters, including, for example, a new data indicator (NDI), a redundancy version identification (RVID), an MCS, and other parameters. Guard period 350 may not transport any information and/or data to aid in obviating interference between downlink and uplink transmissions.

The PUSCH 355 may be the set of resource elements corresponding to the set of symbol periods that includes the third through the fourteenth symbol period of the TTI 305 and the set of subcarriers within the bandwidth 365 of the PUSCH 355. In the depicted example, the PUSCH 355 includes 144 resource elements 370, and may include other numbers of resource elements in other examples. The UCI transmitted in PUSCH 355 may include, for example, one or more of a demodulation reference signal (DMRS) 320, HARQ-ACK information 325, CSI part 1 330 information, CSI part 2 335 information, additional DMRS 340, PTRS 375, various optional information 345, or any combinations thereof. CSI part 1 330 may be transmitted in its entirety before CSI part 2 335 and may be used to identify the number of information bits in the CSI part 2 335 information. CSI part 1 330 may contain RI, CQI, and an indication of the number of non-zero wideband amplitude coefficients per layer for the CSI. CSI part 2 335 may include a number of partitions of CSI information for CSI information related to a number of frequency sub-bands. As indicated above, according to aspects of the present disclosure, the UE may calculate the BPRE, and thus the corresponding term $\Delta_{TF,b,f,c}(i)$, based on the CSI part 1 330 information, as well as CSI part 2 335 information and HARQ-ACK information 325.

In some cases, the UE may calculate BPRE based on signaled modulation order and code rate provided in DCI as:

$$BPRE = coderate \times f(modulation),$$

where f(BPSK)=1, f(QPSK)=2, f(16QAM)=4; f(64QAM)=6, f(256QAM)=8.

In other cases, the signaling of modulation order and code rate is via an MCS field/index in DCI. In such cases, the UE may determine the BPRE via a look-up table defined, such as illustrated in FIG. 4 described below, and the UE can use the look-up table to get BPRE, or spectrum efficiency, directly via signaled MCS index in DCI.

FIG. 4 illustrates an example of a look-up table 400 that supports power control techniques for uplink control information transmissions in wireless communications in accordance with various aspects of the present disclosure. In some examples, look-up table 400 may implement aspects of wireless communication system 100 or 200.

In this example, the look-up table 400 may include an MCS index column 405 that includes a number of index values $I_{MCS}$. In some cases, the index may be a 5-bit value that supports 32 different MCS indices. Each index value may have a corresponding modulation order 410 ($Q_m$), target code rate value 415 (R) and spectral efficiency 420. Accordingly, the UE may use the value for the spectral efficiency 420 as the BPRE value in the corresponding term $\Delta_{TF,b,f,c}(i)$.

In further examples, a UE may, based on signaled modulation order, code rate, and number of RBs for a PUSCH transmission, calculate a TBS, denoted as T, for the UCI on PUSCH without UL-SCH by following the same procedure of TBS determination defined for regular PUSCH transmission with UL-SCH (e.g., as defined in 3GPP TS 38.214 Section 6.1.4.2). Such a TBS determination may be performed, in some cases, as follows:

A UE first determines the number of REs allocated for PUSCH within a PRB (N'$_{RE}$) by N'$_{RE}$=N$_{sc}^{RB}$·N$_{symb}^{sh}$ − N$_{DMRS}^{PRB}$−N$_{oh}^{PRB}$, where N$_{sc}^{RB}$=12 is the number of subcarriers in the frequency domain in a physical RB, N$_{symb}^{sh}$ is the number of symbols of the PUSCH allocation within the slot, N$_{DMRS}^{PRB}$ is the number of REs for DM-RS per PRB in the scheduled duration including the overhead of the DM-RS CDM groups indicated by DCI format 0_0/0_1, and N$_{oh}^{PRB}$ is the overhead configured by higher layer parameter.

A UE determines the total number of REs allocated for PUSCH (N$_{RE}$) by N$_{RE}$=min(156, N'$_{RE}$)·n$_{PRB}$ where n$_{PRB}$ is the total number of allocated PRBs for the UE.

The TBS (T) may then be determined based on a number of information bits and a table of TBS sizes or predefined function (e.g. as described in 3GPP TS 38.214).

The BPRE for UCI multiplexing on PUSCH without UL-SCH may then be determined based on $$BPRE = T/N_{RE}$$

where NR$_E$ is the number of resource elements determined as N$_{RE}$=M$_{RB,b,f,c}^{PUSCH}$(i)·N$_{symb,b,f,c}^{PUSCH}$(i) excluding REs used for DM-RS transmission, where N$_{symb}^{PUSH}$(i) is the number of symbols for PUSCH transmission period i on UL BWP b of carrier f of serving cell c, and where M$_{RB,b,f,c}^{PUSCH}$(i) is the bandwidth of the PUSCH resource assignment expressed in number of RBs for PUSCH transmission period i on UL BWP b of carrier f of serving cell c.

Figure 5:
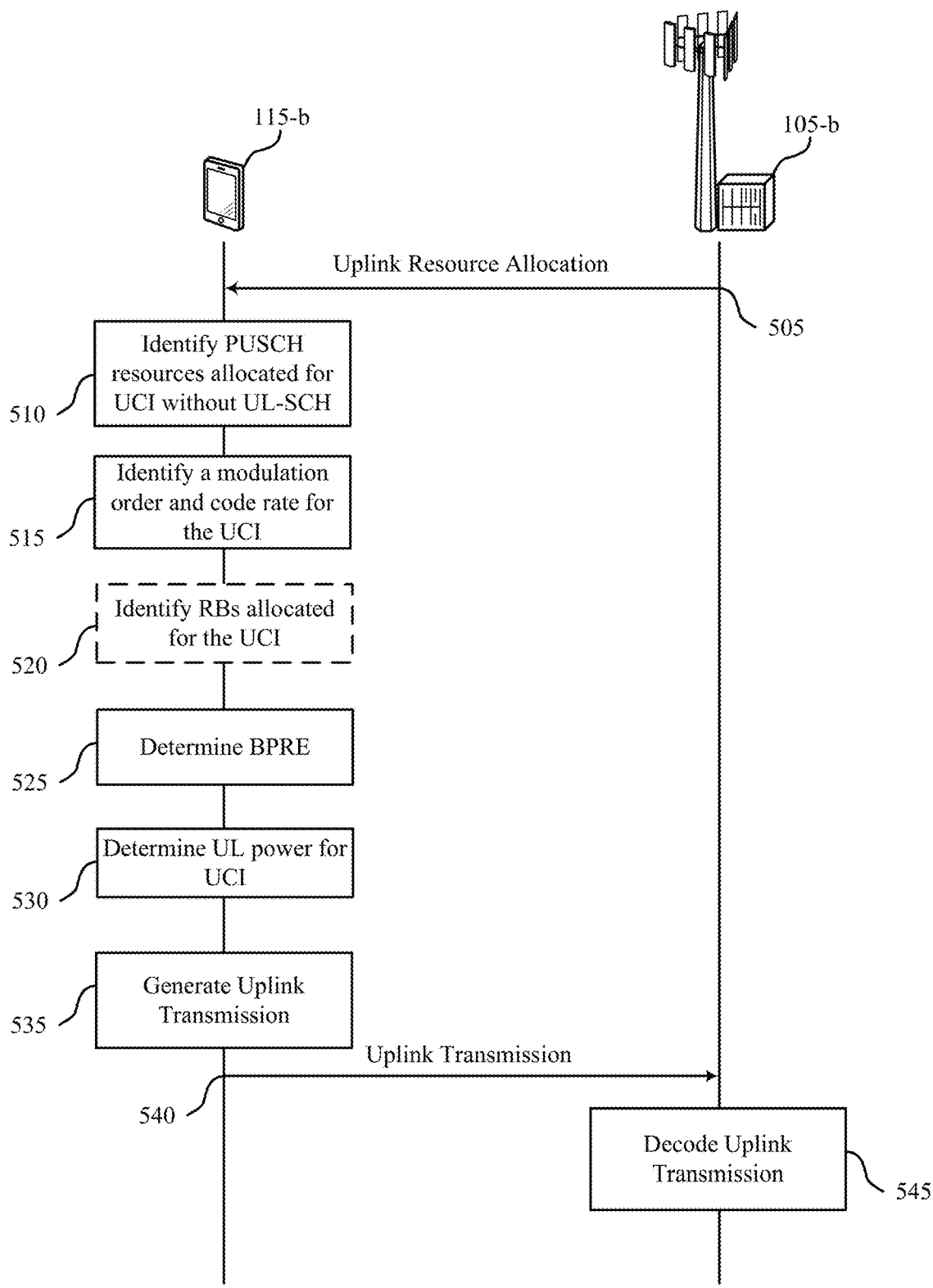
FIG. 5 illustrates an example of a process flow that supports power control techniques for uplink control information transmissions in wireless communications in accordance with aspects of the present disclosure.

FIG. 5 illustrates an example of a process flow 500 that supports power control techniques for uplink control information transmissions in wireless communications in accordance with various aspects of the present disclosure. In some examples, process flow 500 may implement aspects of wireless communication system 100 or 200. For example, process flow 500 includes UE 115-b and base station 105-b, which may be examples of the corresponding devices described with reference to FIGS. 1 and 2.

Base station 105-b may transmit downlink signaling (e.g., DCI, RRC signaling) as part of an uplink resource allocation transmission 505 to UE 115-b. The transmission 505 may include DCI including a grant indicating a resource allocation for an uplink transmission in an UL-SCH. The resource allocation may correspond to a set of time and frequency resources for the UE 115-b to send a PUSCH transmission. The grant may indicate a set of uplink parameters for the uplink transmission. UE 115-b may receive and process transmission 505 to obtain the resource grant. In some examples, UE 115-b may determine that transmission 505 does not allocate any resource elements of the PUSCH transmission to transport UL-SCH data and to only include UCI within the uplink transmission.

At 510, UE 115-b may identify PUSCH resources allocated for UCI without UL-SCH. Such resources may be identified based on resource allocation information in the DCI from the base station 105-b.

At 515, the UE 115-b may identify a modulation order and code rate for the UCI. In some cases, the code rate for the UCI may be determined based at least in part on a payload size of the UCI and a number of resources elements allocated to the UE 115-*b* for the uplink transmission. In some cases, the UCI may include CSI part 1 information, CSI part 2 information, HARQ-ACK information, or any combinations thereof.

Optionally, at 520, the UE 115-*b* may identify RBs allocated for the UCI. In some cases, the RBs may be identified based on the DCI and the uplink resource allocation.

At 525, the UE 115-*b* in this example may determine the BPRE for the UCI. As discussed above, the BPRE may be determined, in some cases, as a multiple of the code rate, where the multiple is a function of the signaled modulation order. In some cases, the UE may identify the BPRE based on a mapping (e.g., provided in a look-up table) between the BPRE and an MCS field or index signaled with the DCI. In further cases, the UE may calculate a TBS (T) for the UCI based at least in part on the code rate, the modulation order, and the number of RBs allocated for the transmission of the UCI, and may determine the BPRE based on a ratio between the calculated TBS and a number of resource elements to be used for the transmission of the UCI.

At 530, the UE 115-*b* may determine the uplink power for the UCI transmission. The uplink power may be determined using the determined BPRE, as discussed above with respect to FIG. 2.

Following the determine of the uplink transmit power, UE 115-*b* may generate shared channel transmission at 535. The generation may include mapping CSI part 1 and optionally HARQ-ACK and/or CSI part 2 to the resources of PUSCH allocated by the grant, in association with additional coded modulation signaling (e.g., DMRS, PTRS, additional UCI data payload). UE 115-*b* may then transmit the uplink transmission 540 to base station 105-*b* on the UL-SCH. In some cases, the UCI may include a phase tracking reference signal (PTRS).

At 545, base station 105-*b* may monitor the UL-SCH for the uplink transmission and decode the coded modulation symbols of the UL-SCH to receive the UCI.

Figure 6:
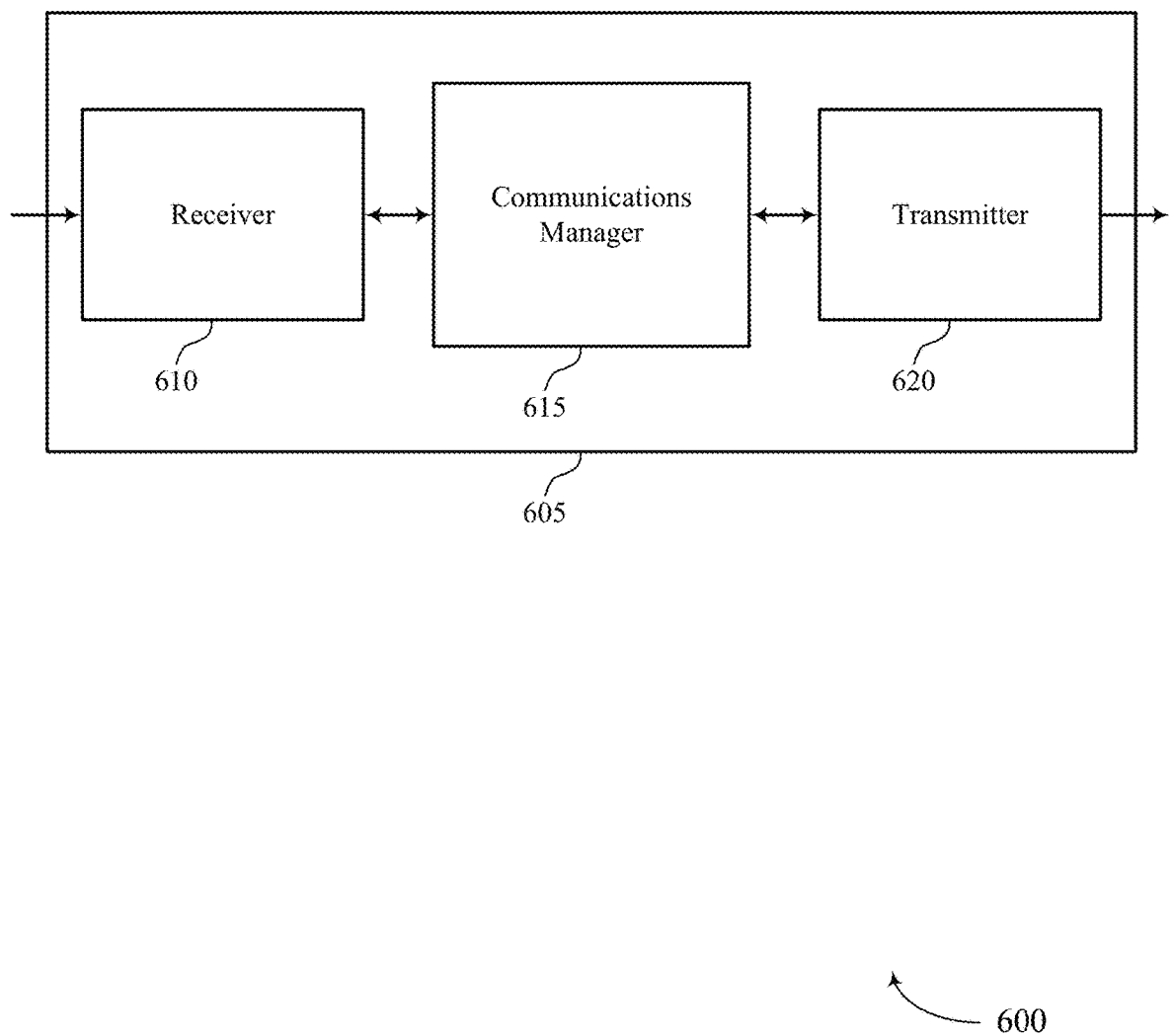
FIGS. 6 through 8 show block diagrams of a device that supports power control techniques for uplink control information transmissions in wireless communications in accordance with aspects of the present disclosure.

FIG. 6 shows a block diagram 600 of a wireless device 605 that supports power control techniques for uplink control information transmissions in wireless communications in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to power control techniques for UCI transmissions in wireless communications, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may receive a grant indicating allocated uplink resources of an UL-SCH for an uplink transmission, the allocated uplink resources including resources allocated for transmission of UCI and lacking resources allocated for transmission of other UL-SCH information, identify, based on one or more of a modulation order or code rate for the UCI indicated in the grant, a number of BPRE for the UCI, and determine, based on the BPRE, an uplink power for transmission of the UCI. Additionally or alternatively, receiver 610 may similarly receive a grant indicating allocated uplink resources of an UL-SCH for an uplink transmission, the allocated uplink resources including resources allocated for transmission of UCI and lacking resources allocated for transmission of other UL-SCH information, and may communicate the received grant to the communications manager 615. Additionally, the received transmission may include DCI including a grant indicating a resource allocation for an uplink transmission in an UL-SCH. The resource allocation may correspond to a set of time and frequency resources for the UE 115 to send a PUSCH transmission. The grant may indicate a set of uplink parameters for the uplink transmission. Wireless device 605 or UE 115 may receive and process the transmission to obtain the resource grant.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
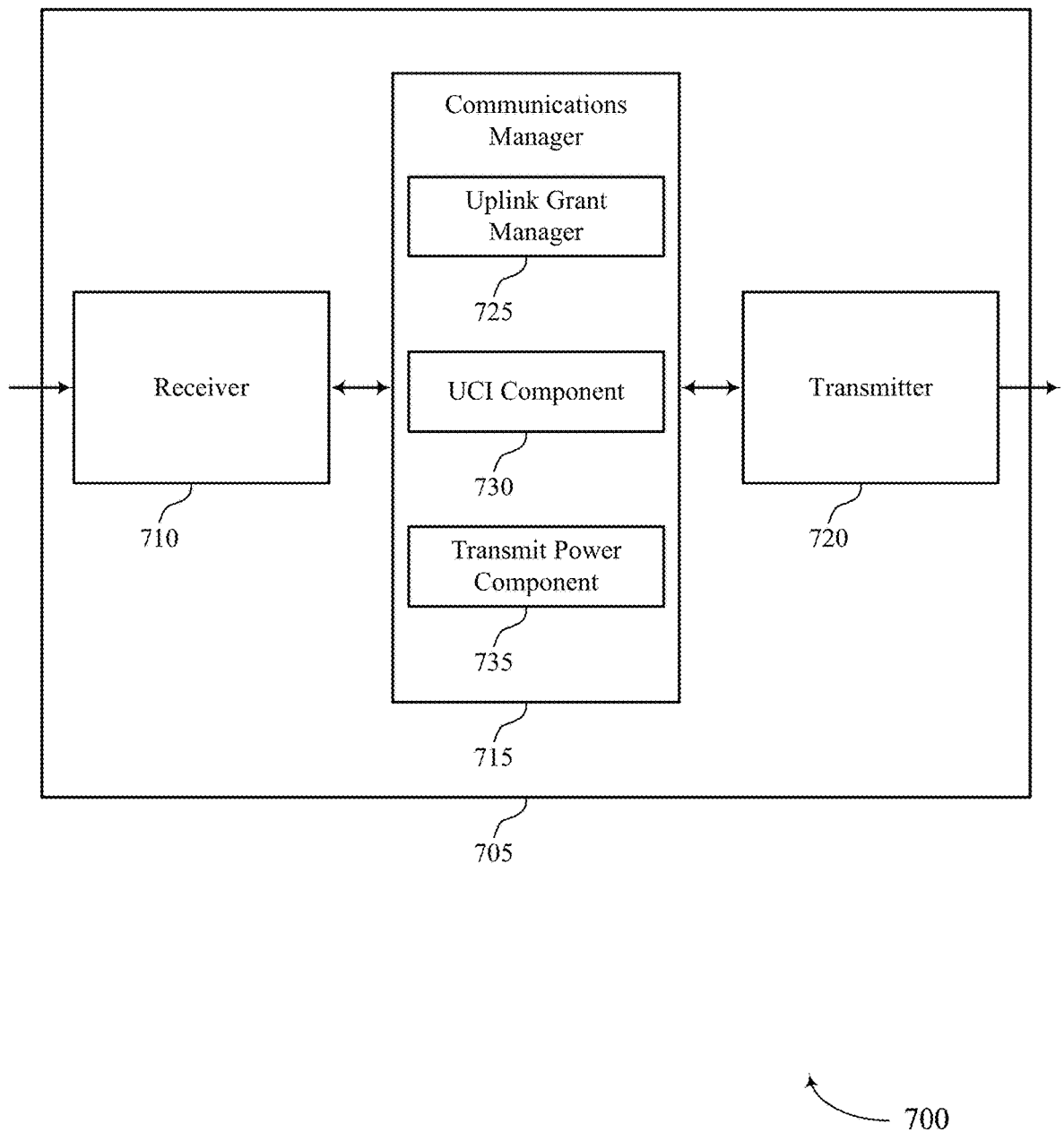

FIG. 7 shows a block diagram 700 of a wireless device 705 that supports power control techniques for uplink control information transmissions in wireless communications in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to power control techniques for UCI transmissions in wireless communications, etc.). Information may be passed on to other components of the device. The receiver 710 may be an example of aspects of the transceiver 935 described with reference to FIG. 9. The receiver 710 may utilize a single antenna or a set of antennas. Additionally or alternatively, receiver 710 may similarly receive a grant indicating allocated uplink resources of an UL-SCH for an uplink transmission, the allocated uplink resources including resources allocated for transmission of UCI and lacking resources allocated for transmission of other UL-SCH information and may communicate the received grant to the communications manager 715. Additionally, the received transmission may include DCI including a grant indicating a resource allocation for an uplink transmission in an UL-SCH. The resource allocation may correspond to a set of time and frequency resources for the UE 115 to send a PUSCH transmission. The grant may indicate a set of uplink parameters for the uplink transmission. Wireless device 705 or UE 115 may receive and process the transmission to obtain the resource grant Communications manager 715 may be an example of aspects of the communications manager 915 described with reference to FIG. 9.

Communications manager 715 may also include uplink grant manager 725, UCI component 730, and transmit power component 735.

Uplink grant manager 725 may receive a grant indicating allocated uplink resources of an UL-SCH for an uplink transmission, the allocated uplink resources including resources allocated for transmission of UCI and lacking resources allocated for transmission of other UL-SCH information.

UCI component 730 may identify, based on one or more of a modulation order or code rate for the UCI indicated in the grant, a number of BPRE for the UCI, determine the BPRE based on a product of the code rate and the modulation order indicated in the grant, determine the BPRE as multiple of the code rate, where the multiple is a function of the modulation order indicated in the grant, and transmit the UCI using the determined uplink power. In some cases, the UCI includes one or more of acknowledgment/negative-acknowledgment (ACK/NACK) feedback information, or one or more CSI parts.

Transmit power component 735 may determine, based on the BPRE, an uplink power for transmission of the UCI. In some cases, the transmit power may be determined as discussed above with respect to FIG. 2 based on the BPRE that may be determined as discussed above with respect to FIGS. 3-4.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas. Additionally or alternatively, transmitter 720 may similarly transmit the resources allocated for transmission of UCI and may communicate the received grant to the communications manager 715, and may further transmit the UCI using the determined uplink power. Additionally, the received transmission may include DCI including a grant indicating a resource allocation for an uplink transmission in an UL-SCH. The resource allocation may correspond to a set of time and frequency resources for the UE 115 to send a PUSCH transmission via the transmitter 720. The grant may indicate a set of uplink parameters for the uplink transmission.

Figure 8:
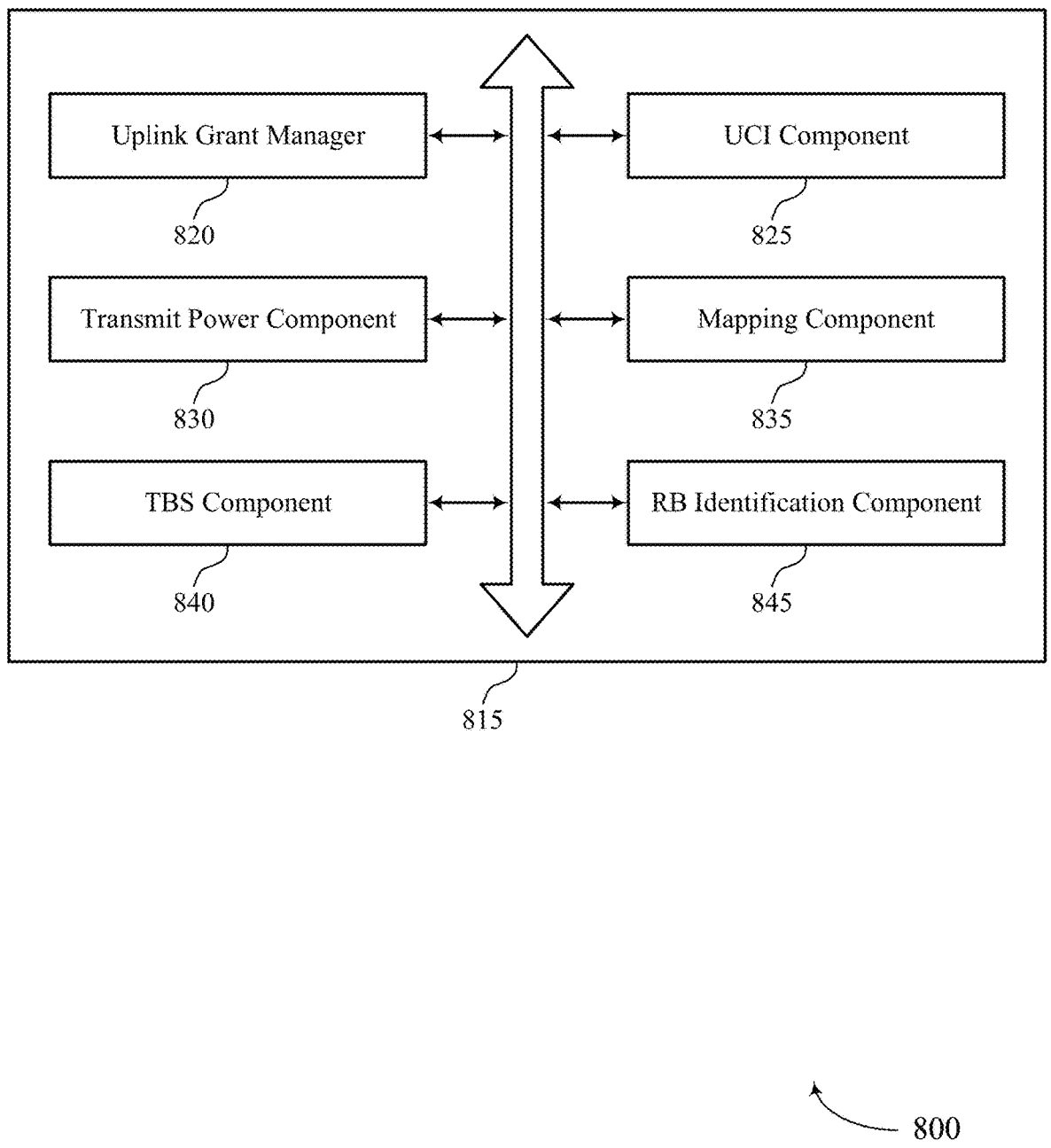

FIG. 8 shows a block diagram 800 of a communications manager 815 that supports power control techniques for uplink control information transmissions in wireless communications in accordance with aspects of the present disclosure. The communications manager 815 may be an example of aspects of a communications manager 615, a communications manager 715, or a communications manager 915 described with reference to FIGS. 6, 7, and 9. The communications manager 815 may include uplink grant manager 820, UCI component 825, transmit power component 830, mapping component 835, TBS component 840, and RB identification component 845. Each of these modules may communicate, directly or indirectly, with one another (e.g., via one or more buses).

Uplink grant manager 820 may receive a grant indicating allocated uplink resources of an UL-SCH for an uplink transmission, the allocated uplink resources including resources allocated for transmission of UCI and lacking resources allocated for transmission of other UL-SCH information. Uplink grant manager 820 may be a component of a mobile device or UE 115 as discussed herein. Additionally or alternatively, a receiver, which may be part of the UE 115 may receive the grant and send the grant to the communications manager 815 to be received by the uplink grant manager 820.

UCI component 825 may identify, based on one or more of a modulation order or code rate for the UCI indicated in the grant, a number of BPRE for the UCI, determine the BPRE based on a product of the code rate and the modulation order indicated in the grant, determine the BPRE as a multiple of the code rate, where the multiple is a function of the modulation order indicated in the grant, and transmit the UCI using the determined uplink power. In some cases, the UCI includes one or more of acknowledgment/negative-acknowledgment (ACK/NACK) feedback information, or one or more CSI parts. UCI component 825 may be included as part of a mobile device or UE 115 as discussed herein. Additionally or alternatively, a transmitter, which may be part of the UE 115 may receive the grant from the communications manager 815 and transmit the UCI indicated in the grant.

Transmit power component 830 may determine, based on the BPRE, an uplink power for transmission of the UCI. In some cases, the transmit power may be determined as discussed above with respect to FIG. 2 based on the BPRE that may be determined as discussed above with respect to FIGS. 3-4.

Mapping component 835 may identify the BPRE based on a mapping between an MCS indicated in the grant and a spectral efficiency. In some cases, the MCS is indicated as an MCS index value in the grant, and where the spectral efficiency is mapped to the MCS index value. In some cases, the mapping is provided in a preconfigured look-up table, such as discussed with respect to FIG. 4.

TBS component 840 may calculate a TBS for the transmission of the UCI based on the code rate, the modulation order, and a number of RBs allocated for the transmission of the UCI and determine the BPRE based on a ratio between the calculated TBS and a number of resource elements to be used for the transmission of the UCI. In some cases, the BPRE is determined by dividing the TBS by the number of resource elements. In some cases, the number of resource elements is determined based on the number of RBs indicated in the grant and a number of symbols in transmission period for the transmission of the UCI. In some cases, the TBS is determined according to a preconfigured TBS calculation procedure for UL-SCH transmission having resources allocated for transmission of other UL-SCH information, such as discussed above with respect to FIG. 4.

RB identification component 845 may identify a number of RBs for transmission of the UCI indicated in the grant and determine the BPRE further based on the number of RBs, the code rate, and the modulation order.

Figure 9:
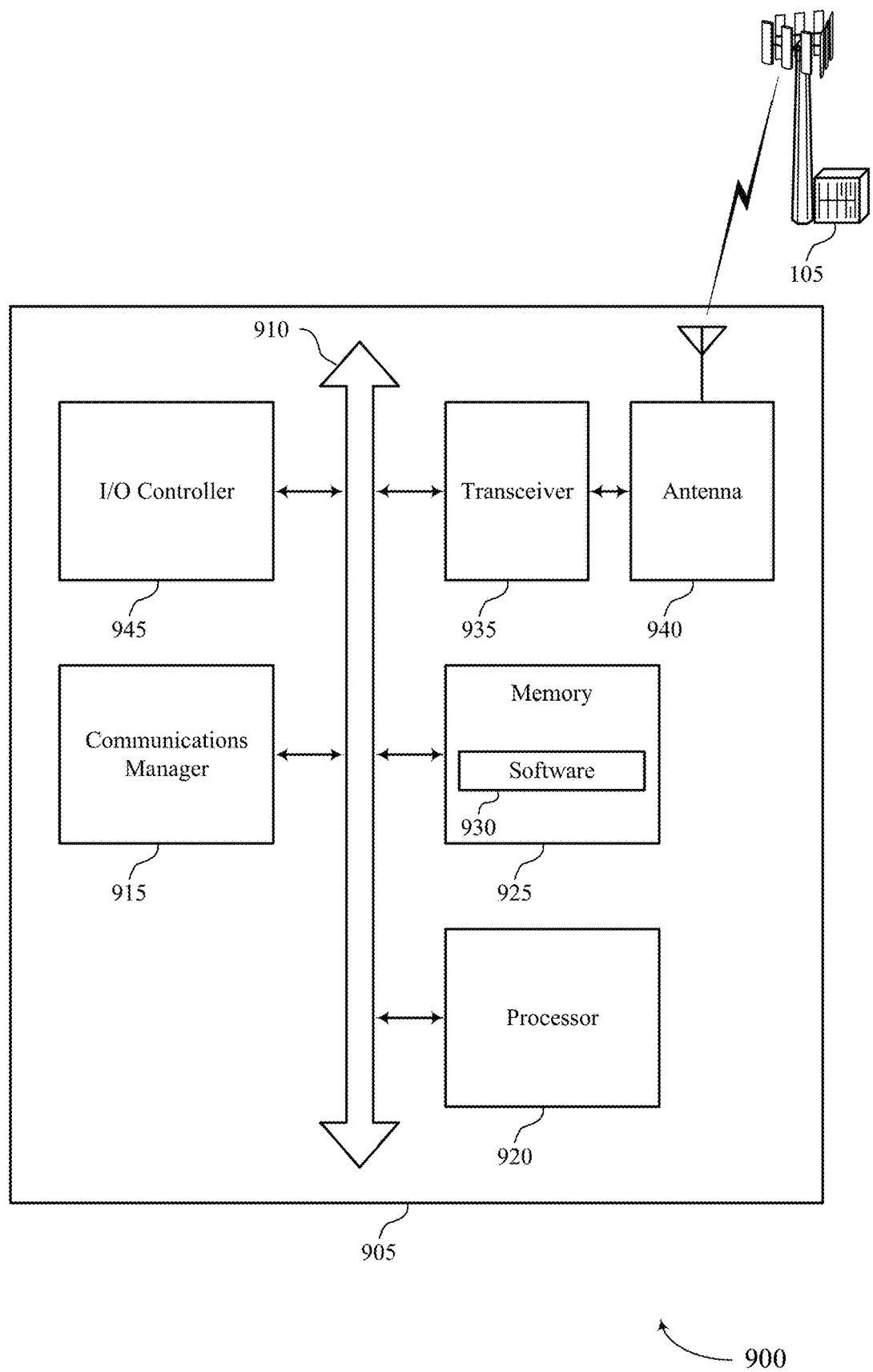
FIG. 9 illustrates a block diagram of a system including a UE that supports power control techniques for uplink control information transmissions in wireless communications in accordance with aspects of the present disclosure.

FIG. 9 shows a diagram of a system 900 including a device 905 that supports power control techniques for uplink control information transmissions in wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting power control techniques for UCI transmissions in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support power control techniques for UCI transmissions in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some examples, communications manager 915 may be a component of a transmitter of the wireless, which may also include the transceiver 935.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
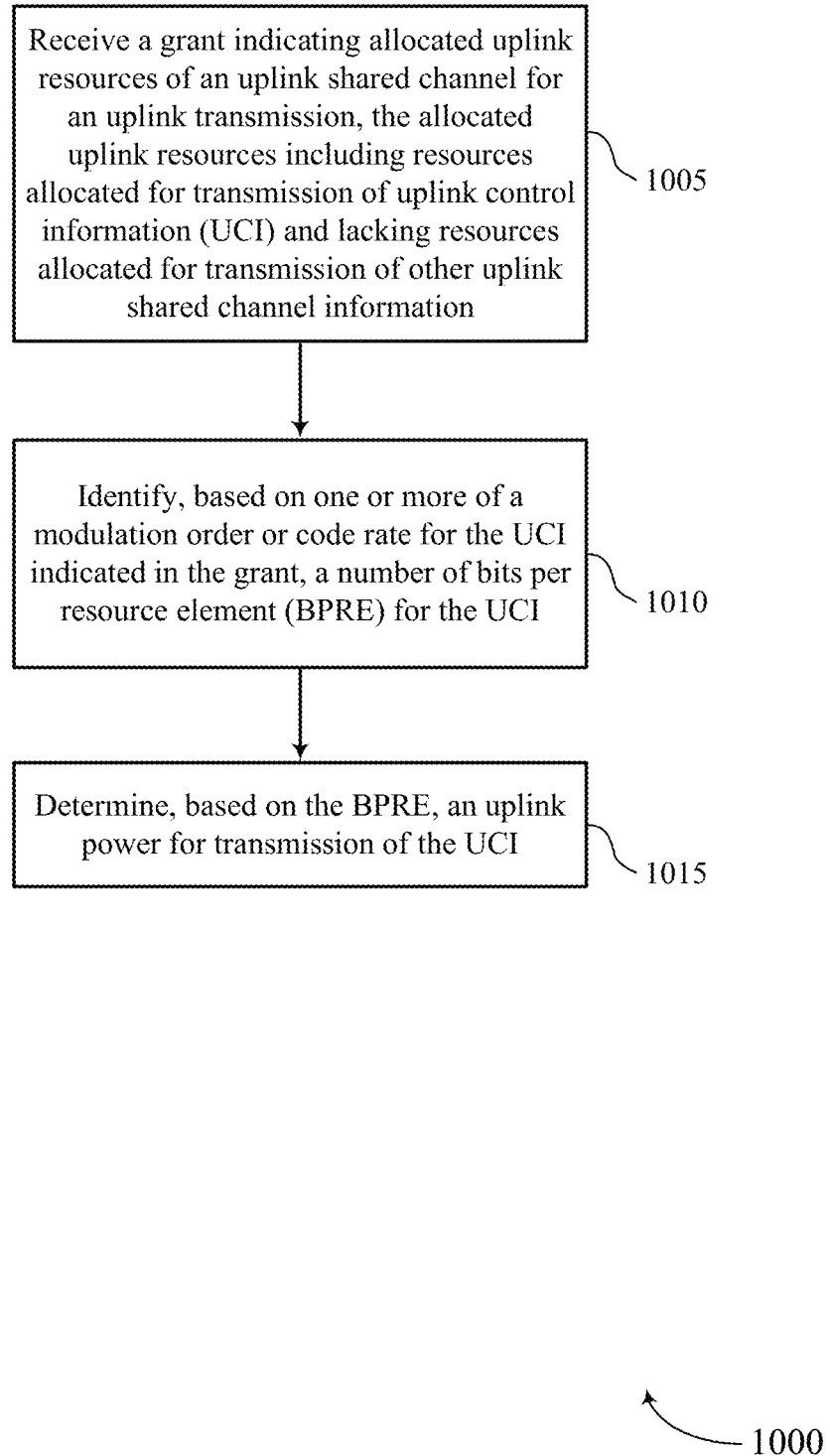
FIGS. 10 through 16 illustrate methods for power control techniques for uplink control information transmissions in wireless communications in accordance with aspects of the present disclosure.

FIG. 10 shows a flowchart illustrating a method 1000 for power control techniques for uplink control information transmissions in wireless communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1005 the UE 115 may receive, by a UE, a grant indicating allocated uplink resources of an UL-SCH for an uplink transmission, the allocated uplink resources including resources allocated for transmission of UCI and lacking resources allocated for transmission of other UL-SCH information. The operations of 1005 may be performed according to the methods described herein. In certain examples, aspects of the operations of 1005 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1010 the UE 115 may identify, based at least in part on one or more of a modulation order or code rate for the UCI indicated in the grant, a number of BPRE for the UCI. The operations of 1010 may be performed according to the methods described herein. In certain examples, aspects of the operations of 1010 may be performed by a UCI component as described with reference to FIGS. 6 through 9.

At 1015 the UE 115 may determine, based at least in part on the BPRE, an uplink power for transmission of the UCI. The operations of 1015 may be performed according to the methods described herein. In certain examples, aspects of the operations of 1015 may be performed by a transmit power component as described with reference to FIGS. 6 through 9.

Figure 11:
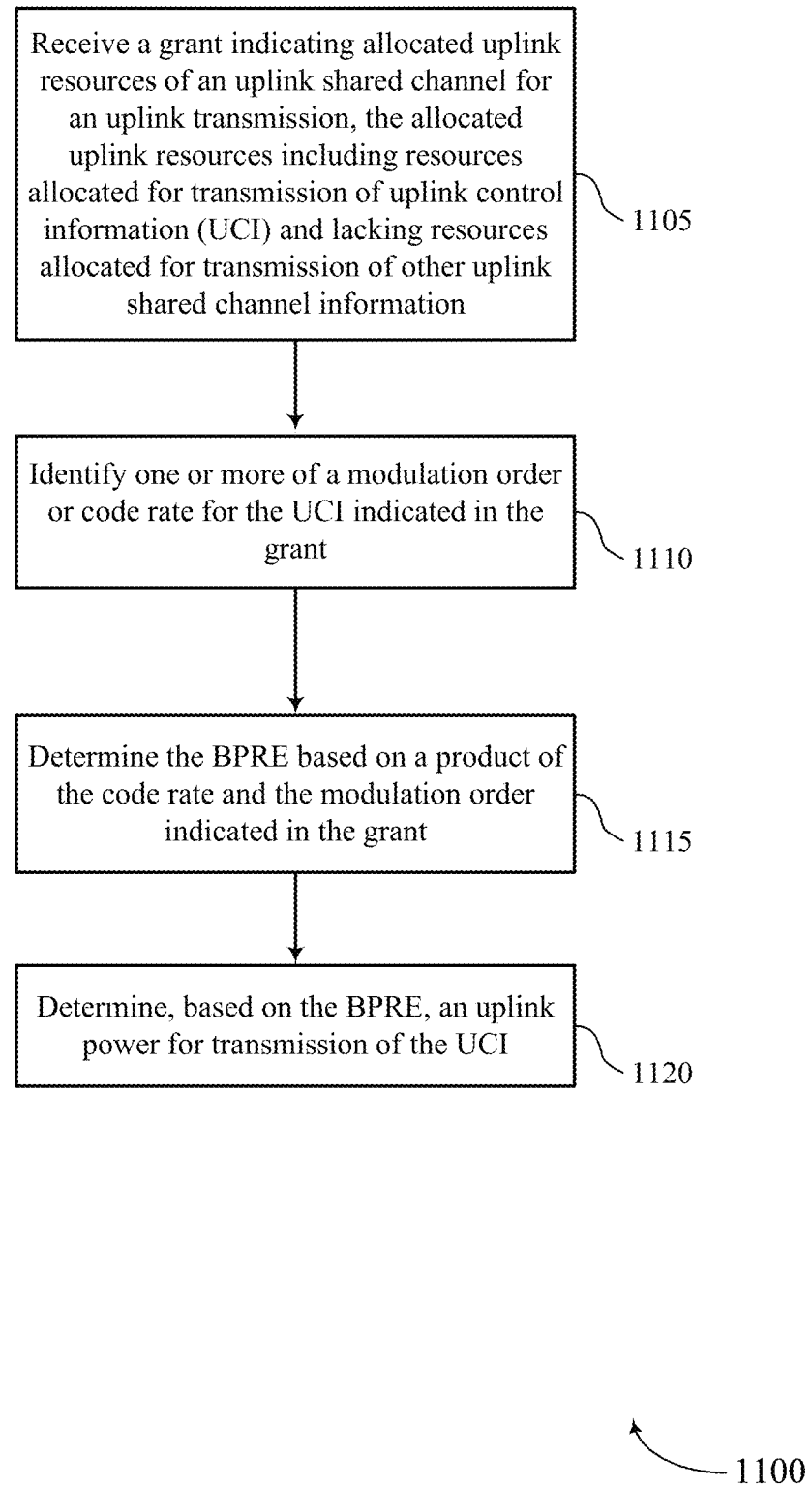

FIG. 11 shows a flowchart illustrating a method 1100 for power control techniques for uplink control information transmissions in wireless communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1105 may be performed according to the methods described herein. In certain examples, aspects of the operations of 1105 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1110 the UE 115 may identify one or more of a modulation order or code rate for the UCI indicated in the grant. The operations of 1110 may be performed according to the methods described herein. In certain examples, aspects of the operations of 1110 may be performed by a UCI component as described with reference to FIGS. 6 through 9.

At 1115 the UE 115 may determine the BPRE based at least in part on a product of the code rate and the modulation order indicated in the grant. The operations of 1115 may be performed according to the methods described herein. In certain examples, aspects of the operations of 1115 may be performed by a UCI component as described with reference to FIGS. 6 through 9.

At 1120 the UE 115 may determine, based at least in part on the BPRE, an uplink power for transmission of the UCI. The operations of 1120 may be performed according to the methods described herein. In certain examples, aspects of the operations of 1120 may be performed by a transmit power component as described with reference to FIGS. 6 through 9.

Figure 12:
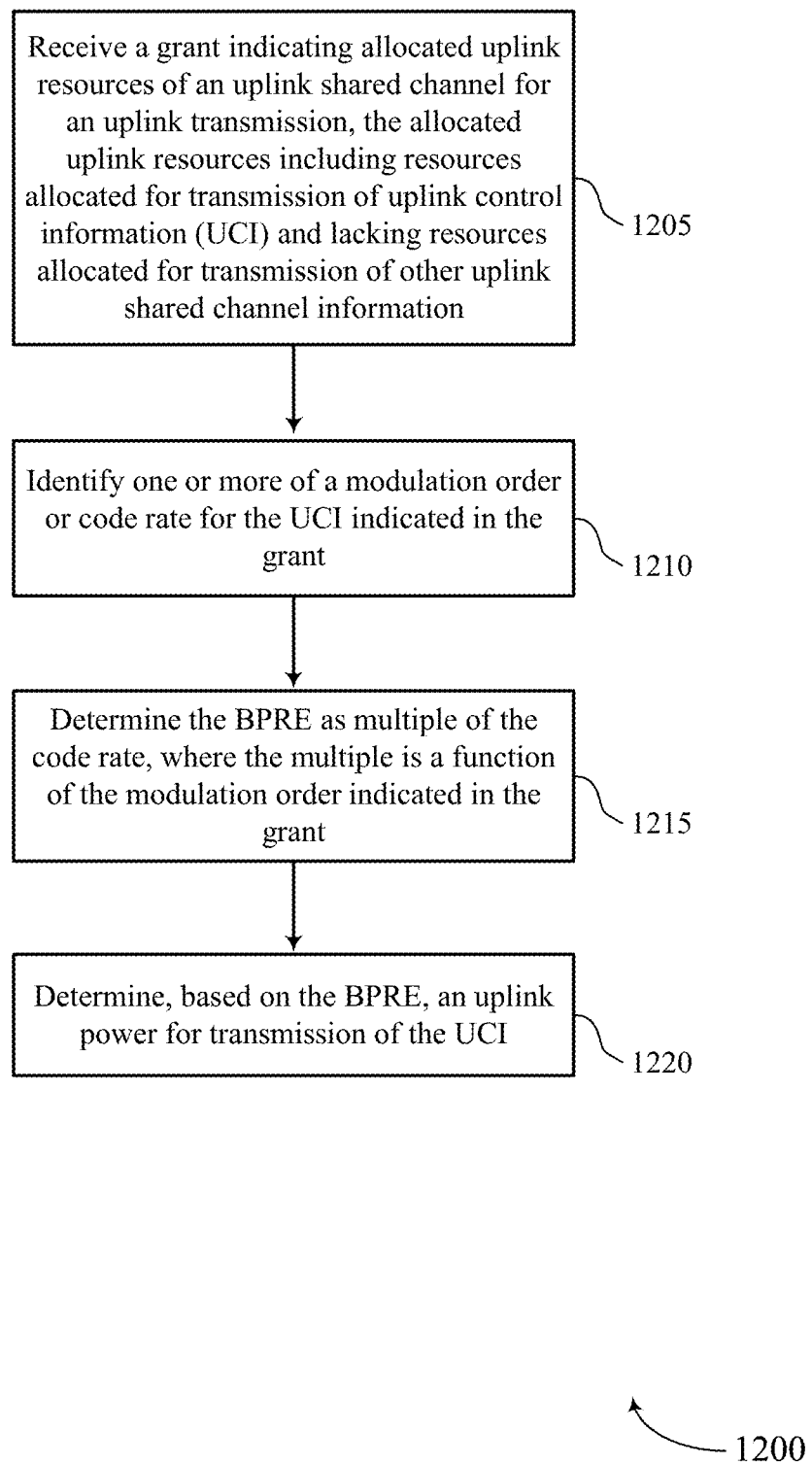

FIG. 12 shows a flowchart illustrating a method 1200 for power control techniques for uplink control information transmissions in wireless communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1205 may be performed according to the methods described herein. In certain examples, aspects of the operations of 1205 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1210 the UE 115 may identify one or more of a modulation order or code rate for the UCI indicated in the grant. The operations of 1210 may be performed according to the methods described herein. In certain examples, aspects of the operations of 1210 may be performed by a UCI component as described with reference to FIGS. 6 through 9.

At 1215 the UE 115 may determine the BPRE as multiple of the code rate, wherein the multiple is a function of the modulation order indicated in the grant. The operations of 1215 may be performed according to the methods described herein. In certain examples, aspects of the operations of 1215 may be performed by a UCI component as described with reference to FIGS. 6 through 9.

At 1220 the UE 115 may determine, based at least in part on the BPRE, an uplink power for transmission of the UCI. The operations of 1220 may be performed according to the methods described herein. In certain examples, aspects of the operations of 1220 may be performed by a transmit power component as described with reference to FIGS. 6 through 9.

Figure 13:
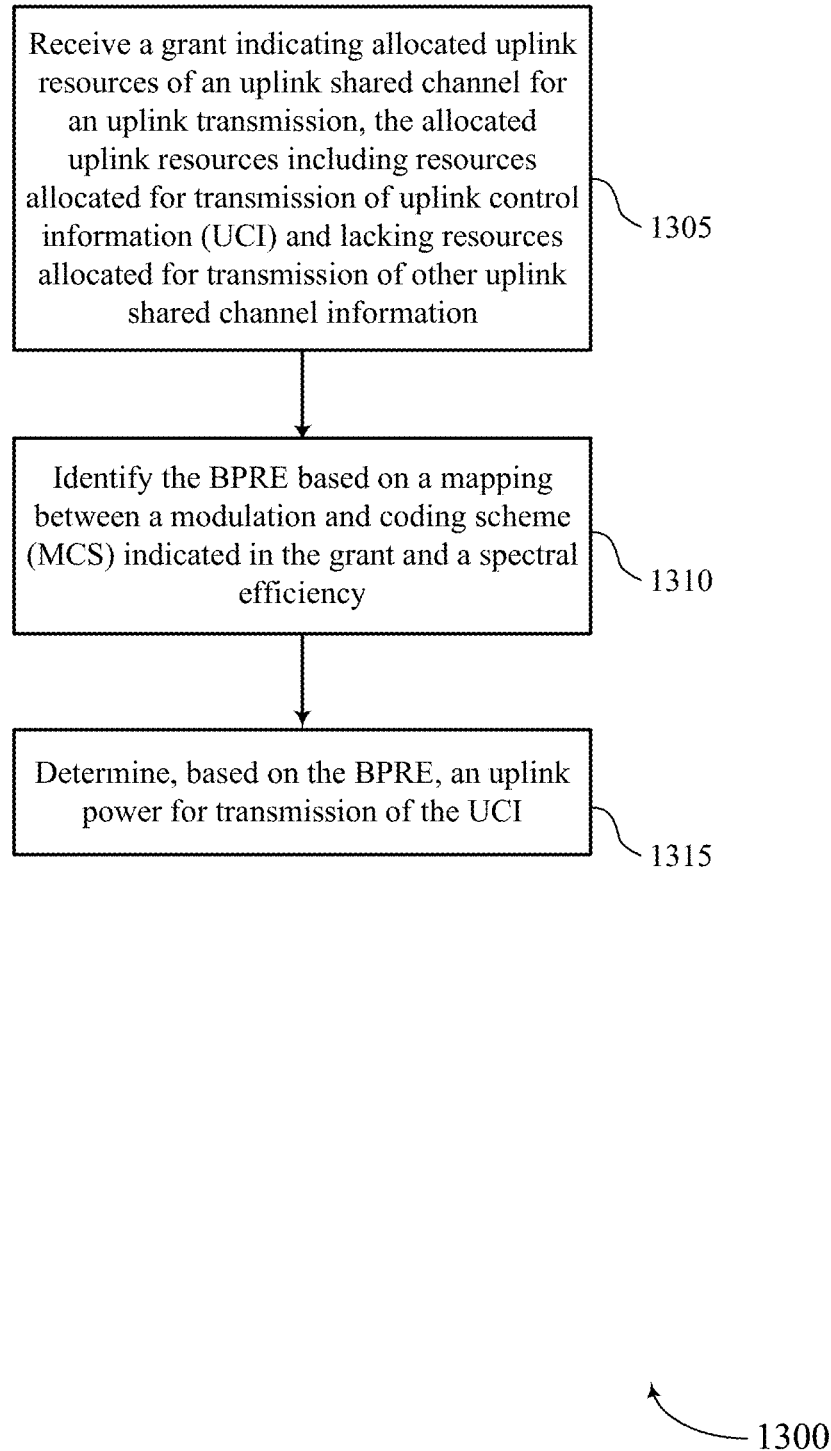

FIG. 13 shows a flowchart illustrating a method 1300 for power control techniques for uplink control information transmissions in wireless communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1305 may be performed according to the methods described herein. In certain examples, aspects of the operations of 1305 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1310 the UE 115 may identify the BPRE based at least in part on a mapping between an MCS indicated in the grant and a spectral efficiency. The operations of 1310 may be performed according to the methods described herein. In certain examples, aspects of the operations of 1310 may be performed by a mapping component as described with reference to FIGS. 6 through 9.

At 1315 the UE 115 may determine, based at least in part on the BPRE, an uplink power for transmission of the UCI. The operations of 1315 may be performed according to the methods described herein. In certain examples, aspects of the operations of 1315 may be performed by a transmit power component as described with reference to FIGS. 6 through 9. In some cases, the MCS is indicated as an MCS index value in the grant, and the spectral efficiency is mapped to the MCS index value. In some cases, the mapping is provided in a preconfigured look-up table.

Figure 14:
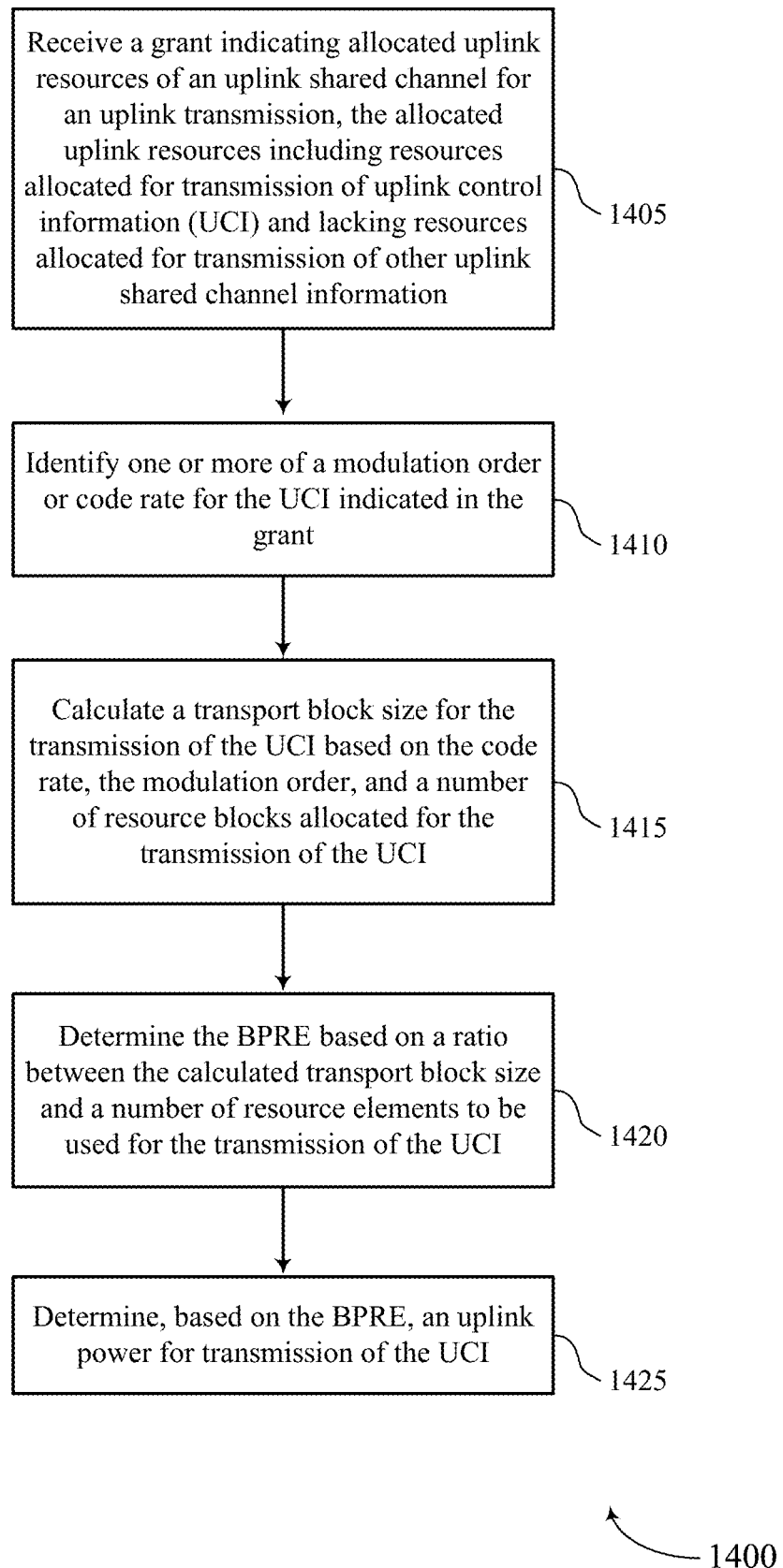

FIG. 14 shows a flowchart illustrating a method 1400 for power control techniques for uplink control information transmissions in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1405 may be performed according to the methods described herein. In certain examples, aspects of the operations of 1405 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1410 the UE 115 may identify one or more of a modulation order or code rate for the UCI indicated in the grant. The operations of 1410 may be performed according to the methods described herein. In certain examples, aspects of the operations of 1410 may be performed by a UCI component as described with reference to FIGS. 6 through 9.

At 1415 the UE 115 may calculate a TBS for the transmission of the UCI based at least in part on the code rate, the modulation order, and a number of RBs allocated for the transmission of the UCI. The operations of 1415 may be performed according to the methods described herein. In certain examples, aspects of the operations of 1415 may be performed by a TBS component as described with reference to FIGS. 6 through 9.

At 1420 the UE 115 may determine the BPRE based on a ratio between the calculated TBS and a number of resource elements to be used for the transmission of the UCI. The operations of 1420 may be performed according to the methods described herein. In certain examples, aspects of the operations of 1420 may be performed by a TBS component as described with reference to FIGS. 6 through 9.

At 1425 the UE 115 may determine, based at least in part on the BPRE, an uplink power for transmission of the UCI. The operations of 1425 may be performed according to the methods described herein. In certain examples, aspects of the operations of 1425 may be performed by a transmit power component as described with reference to FIGS. 6 through 9.

Figure 15:
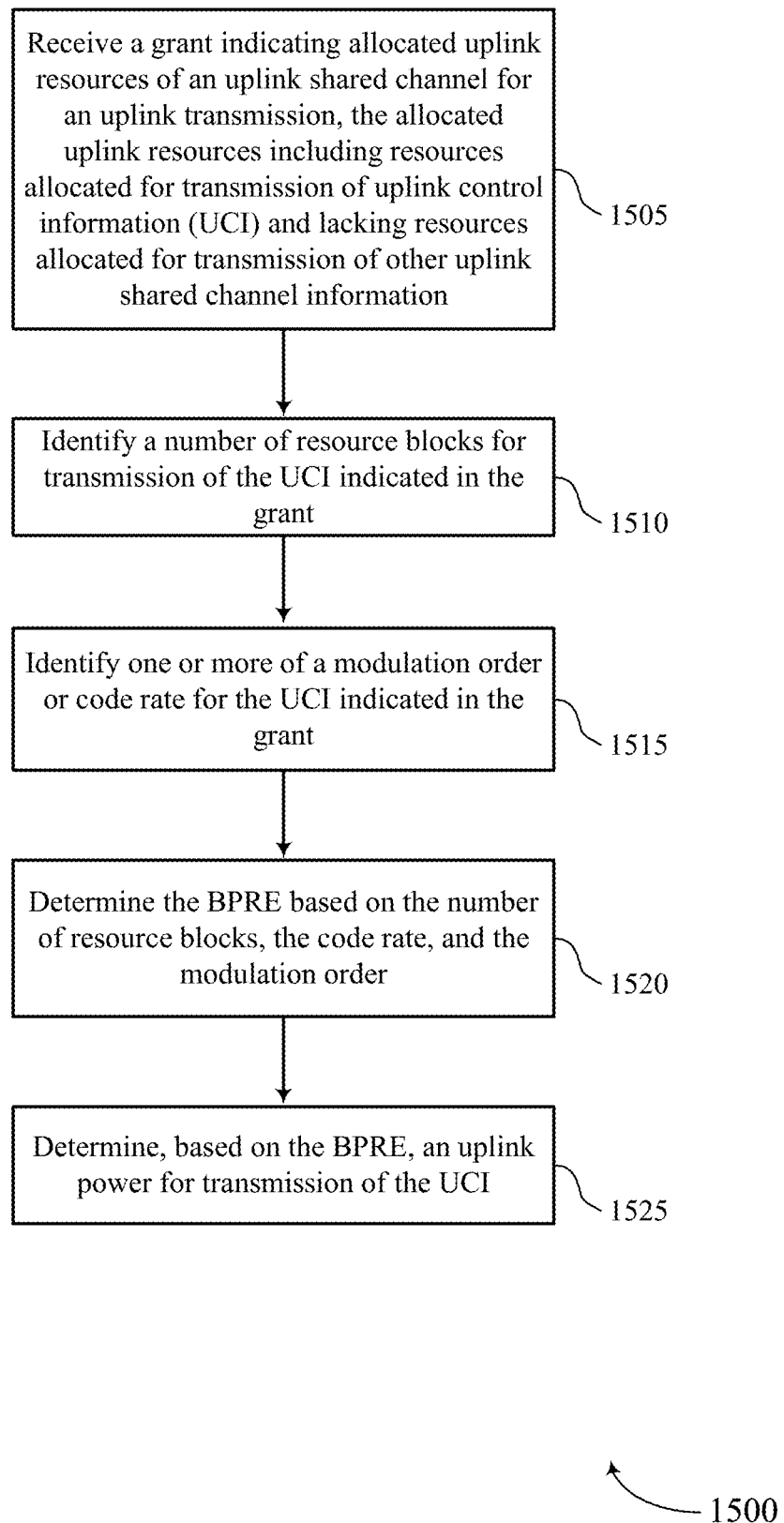

FIG. 15 shows a flowchart illustrating a method 1500 for power control techniques for uplink control information transmissions in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1505 may be performed according to the methods described herein. In certain examples, aspects of the operations of 1505 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1510 the UE 115 may identify a number of RBs for transmission of the UCI indicated in the grant. The operations of 1510 may be performed according to the methods described herein. In certain examples, aspects of the operations of 1510 may be performed by an RB identification component as described with reference to FIGS. 6 through 9.

At 1515 the UE 115 may identify one or more of a modulation order or code rate for the UCI indicated in the grant. The operations of 1515 may be performed according to the methods described herein. In certain examples, aspects of the operations of 1515 may be performed by a UCI component as described with reference to FIGS. 6 through 9.

At 1520 the UE 115 may determine the BPRE further based at least in part on the number of RBs, the code rate, and the modulation order. The operations of 1520 may be performed according to the methods described herein. In certain examples, aspects of the operations of 1520 may be performed by an RB identification component as described with reference to FIGS. 6 through 9.

At 1525 the UE 115 may determine, based at least in part on the BPRE, an uplink power for transmission of the UCI. The operations of 1525 may be performed according to the methods described herein. In certain examples, aspects of the operations of 1525 may be performed by a transmit power component as described with reference to FIGS. 6 through 9.

Figure 16:
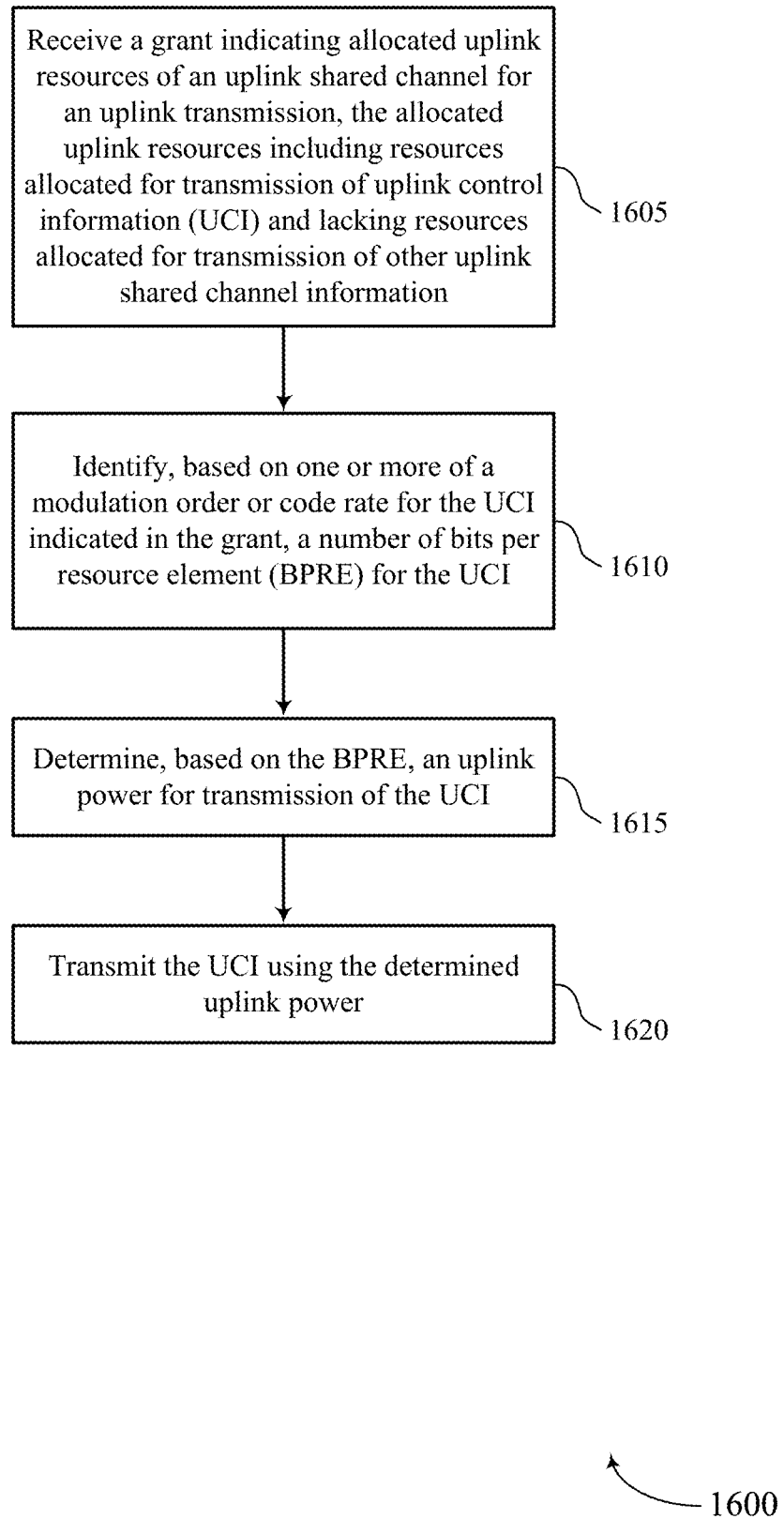

FIG. 16 shows a flowchart illustrating a method 1600 for power control techniques for uplink control information transmissions in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a grant indicating allocated uplink resources of an UL-SCH for an uplink transmission, the allocated uplink resources including resources allocated for transmission of UCI and lacking resources allocated for transmission of other UL-SCH information. The operations of 1605 may be performed according to the methods described herein. In certain examples, aspects of the operations of 1605 may be performed by an uplink grant manager as described with reference to FIGS. 6 through 9. In some examples, the UE 115 may be wireless device 605, 705, or 915 as described herein and the UE may receive the grant at communications manager 615, 715, or 915, respectively, or communications manager 815. The grant may also be received at uplink grant manager 725 of communications manager 715 or uplink grant manager 820 of communications manager 815. Additionally or alternatively, a receiver 610, receiver 710, or transceiver 935 via antenna 940, may receive the grant and send the grant to the communication manager 615, 715, or 915, respectively.

At 1610 the UE 115 may identify, based at least in part on one or more of a modulation order or code rate for the UCI indicated in the grant, a number of BPRE for the UCI. The operations of 1610 may be performed according to the methods described herein. In certain examples, aspects of the operations of 1610 may be performed by a UCI component as described with reference to FIGS. 6 through 9.

At 1615 the UE 115 may determine, based at least in part on the BPRE, an uplink power for transmission of the UCI. The operations of 1615 may be performed according to the methods described herein. In certain examples, aspects of the operations of 1615 may be performed by a transmit power component as described with reference to FIGS. 6 through 9.

At 1620 the UE 115 may transmit the UCI using the determined uplink power. The operations of 1620 may be performed according to the methods described herein. In certain examples, aspects of the operations of 1620 may be performed by a UCI component as described with reference to FIGS. 6 through 9. In some cases, the UCI includes one or more of acknowledgment/negative-acknowledgment (ACK/NACK) feedback information, or one or more channel state information (CSI) parts. In some examples, the UE 115 may be wireless device 605, 705, or 915 as described herein and the UE may transmit the UCI grant from communications manager 615, 715, or 915, respectively, or communications manager 815. The UCI may also be transmitted by UCI component 730 of communications manager 715 or UCI component 825 of communications manager 815. Additionally or alternatively, a transmitter 620, transmitter 720, or transceiver 935 via antenna 940, may receive the UCI from communication manager 615, 715, or 915, respectively, and transmit the UCI.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
  receiving, by a user equipment (UE), a grant indicating allocated uplink resources of an uplink shared channel for an uplink transmission, the allocated uplink resources including resources allocated for transmission of uplink control information (UCI) and not including resources allocated for transmission of uplink shared channel information;

identifying, based at least in part on a modulation order and a code rate for the UCI indicated in the grant, a bits per resource element (BPRE) for the UCI, wherein the identifying further comprises determining the BPRE based at least in part on a product of the code rate and the modulation order indicated in the grant;

determining a power adjustment parameter for calculating an uplink power based at least in part on the BPRE, the modulation order, and an offset, the offset based at least in part on the allocated uplink resources not including the resources allocated for the transmission of the uplink shared channel information;

determining, based at least in part on the power adjustment parameter, the uplink power for the transmission of the UCI; and transmitting, according to the modulation order and the code rate indicated in the grant, the UCI using the determined uplink power.

2. The method of claim 1, wherein the identifying further comprises:
determining the BPRE as a multiple of the code rate, wherein the multiple is a function of the modulation order indicated in the grant.

3. The method of claim 1, wherein the identifying further comprises:
identifying the BPRE based at least in part on a mapping between a modulation and coding scheme (MCS) indicated in the grant and a spectral efficiency.

4. The method of claim 3, wherein the MCS is indicated as an MCS index value in the grant, and wherein the spectral efficiency is mapped to the MCS index value.

5. The method of claim 4, wherein the mapping is provided in a preconfigured look-up table.

6. The method of claim 1, wherein the identifying further comprises:
calculating a transport block size for the transmission of the UCI based at least in part on the code rate, the modulation order, and a number of resource blocks (RBs) allocated for the transmission of the UCI; and
determining the BPRE based on a ratio between the calculated transport block size and a number of resource elements to be used for the transmission of the UCI.

7. The method of claim 6, wherein the BPRE is determined by dividing the transport block size by the number of resource elements.

8. The method of claim 7, wherein the number of resource elements is determined based at least in part on the number of RBs indicated in the grant and a number of symbols in transmission period for the transmission of the UCI.

9. The method of claim 7, wherein the transport block size is determined according to a preconfigured transport block size calculation procedure for uplink shared channel transmission having resources allocated for transmission of other uplink shared channel information.

10. The method of claim 1, wherein the identifying further comprises:
identifying a number of RBs for transmission of the UCI indicated in the grant; and
determining the BPRE further based at least in part on the number of RBs, the code rate, and the modulation order.

11. The method of claim 1, wherein the UCI includes one or more of acknowledgment/negative-acknowledgment (ACK/NACK) feedback information, or one or more channel state information (CSI) parts.

12. An apparatus for wireless communication, comprising:
means for receiving, by a user equipment (UE), a grant indicating allocated uplink resources of an uplink shared channel for an uplink transmission, the allocated uplink resources including resources allocated for transmission of uplink control information (UCI) and not including resources allocated for transmission of uplink shared channel information;

means for identifying, based at least in part on a modulation order and a code rate for the UCI indicated in the grant, a bits per resource element (BPRE) for the UCI, wherein the means for identifying further comprises means for determining the BPRE based at least in part on a product of the code rate and the modulation order indicated in the grant;

means for determining a power adjustment parameter for calculating an uplink power based at least in part on the BPRE, the modulation order, and an offset, the offset based at least in part on the allocated uplink resources not including the resources allocated for the transmission of the uplink shared channel information;

means for determining, based at least in part on the power adjustment parameter, the uplink power for the transmission of the UCI; and means for transmitting, according to the modulation order and the code rate indicated in the grant, the UCI using the determined uplink power.

13. The apparatus of claim 12, wherein the means for identifying determines the BPRE as a multiple of the code rate, wherein the multiple is a function of the modulation order indicated in the grant.

14. The apparatus of claim 12, wherein the means for identifying identifies the BPRE based at least in part on a mapping between a modulation and coding scheme (MCS) indicated in the grant and a spectral efficiency.

15. The apparatus of claim 14, wherein the MCS is indicated as an MCS index value in the grant, and wherein the spectral efficiency is mapped to the MCS index value.

16. The apparatus of claim 12, further comprising:
means for calculating a transport block size for the transmission of the UCI based at least in part on the code rate, the modulation order, and a number of resource blocks (RBs) allocated for the transmission of the UCI; and
wherein the means for determining determines the BPRE based on a ratio between the calculated transport block size and a number of resource elements to be used for the transmission of the UCI.

17. The apparatus of claim 16, wherein the BPRE is determined by dividing the transport block size by the number of resource elements.

18. The apparatus of claim 17, wherein the number of resource elements is determined based at least in part on the number of RBs indicated in the grant and a number of symbols in transmission period for the transmission of the UCI.

19. The apparatus of claim 17, wherein the transport block size is determined according to a preconfigured transport block size calculation procedure for uplink shared channel transmission having resources allocated for transmission of other uplink shared channel information.

20. The apparatus of claim 12, further comprising:
means for identifying a number of RBs for transmission of the UCI indicated in the grant; and wherein the means for determining determines the BPRE further based at least in part on the number of RBs, the code rate, and the modulation order.

21. An apparatus for wireless communication, comprising:
a processor;
memory coupled to the processor; and
instructions stored in the memory and executable by the processor to cause the apparatus to:
receive, by a user equipment (UE), a grant indicating allocated uplink resources of an uplink shared channel for an uplink transmission, the allocated uplink resources including resources allocated for transmission of uplink control information (UCI) and not including resources allocated for transmission of uplink shared channel information;
identify, based at least in part on a modulation order and a code rate for the UCI indicated in the grant, a bits per resource element (BPRE) for the UCI, wherein the identifying further comprises determining the BPRE based at least in part on a product of the code rate and the modulation order indicated in the grant;
determine a power adjustment parameter for calculating an uplink power based at least in part on the BPRE, the modulation order, and an offset, the offset based at least in part on the allocated uplink resources not including the resources allocated for the transmission of the uplink shared channel information;
determine, based at least in part on the power adjustment parameter, the uplink power for the transmission of the UCI; and
transmit, according to the modulation order and the code rate indicated in the grant, the UCI using the determined uplink power.

22. The apparatus of claim 21, wherein the instructions are further executable by the processor to cause the apparatus to:
determine the BPRE as a multiple of the code rate, wherein the multiple is a function of the modulation order indicated in the grant.

23. The apparatus of claim 21, wherein the instructions are further executable by the processor to cause the apparatus to:
identify the BPRE based at least in part on a mapping between a modulation and coding scheme (MCS) indicated in the grant and a spectral efficiency.

24. The apparatus of claim 23, wherein the MCS is indicated as an MCS index value in the grant, and wherein the spectral efficiency is mapped to the MCS index value.

25. The apparatus of claim 21, wherein the instructions are further executable by the processor to cause the apparatus to:
calculate a transport block size for the transmission of the UCI based at least in part on the code rate, the modulation order, and a number of resource blocks (RBs) allocated for the transmission of the UCI; and
determine the BPRE based on a ratio between the calculated transport block size and a number of resource elements to be used for the transmission of the UCI.

26. The apparatus of claim 25, wherein the BPRE is determined by dividing the transport block size by the-number of resource elements.

27. The apparatus of claim 26, wherein the number of resource elements is determined based at least in part on the number of RBs indicated in the grant and a number of symbols in transmission period for the transmission of the UCI.

28. The apparatus of claim 26, wherein the transport block size is determined according to a preconfigured transport block size calculation procedure for uplink shared channel transmission having resources allocated for transmission of other uplink shared channel information.

29. The apparatus of claim 21, wherein the instructions are further executable by the processor to cause the apparatus to:
identify a number of RBs for transmission of the UCI indicated in the grant; and
determine the BPRE further based at least in part on the number of RBs, the code rate, and the modulation order.

30. A non-transitory computer-readable medium storing code for wireless communication, the code comprising instructions executable by a processor to:
receive, by a user equipment (UE), a grant indicating allocated uplink resources of an uplink shared channel for an uplink transmission, the allocated uplink resources including resources allocated for transmission of uplink control information (UCI) and not including resources allocated for transmission of uplink shared channel information;
identify, based at least in part on a modulation order and a code rate for the UCI indicated in the grant, a bits per resource element (BPRE) for the UCI, wherein the identifying further comprises determining the BPRE based at least in part on a product of the code rate and the modulation order indicated in the grant;
determine a power adjustment parameter for calculating an uplink power based at least in part on the BPRE, the modulation order, and an offset, the offset based at least in part on the allocated uplink resources not including the resources allocated for the transmission of the uplink shared channel information;
determine, based at least in part on the power adjustment parameter, the uplink power for the transmission of the UCI; and
transmit, according to the modulation order and the code rate indicated in the grant, the UCI using the determined uplink power.

* * * * *